US012767773B2

(12) United States Patent
Hondo

(10) Patent No.: US 12,767,773 B2
(45) Date of Patent: Oct. 20, 2026

(54) EPOXY RESIN COMPOSITION FOR FIBER-REINFORCED COMPOSITE MATERIAL, FIBER-REINFORCED COMPOSITE MATERIAL, AND METHOD FOR PRODUCING FIBER-REINFORCED COMPOSITE MATERIAL

(71) Applicant: Toray Industries, Inc., Tokyo (JP)

(72) Inventor: Kazunori Hondo, Nagoya (JP)

(73) Assignee: Toray Industries, Inc., Tokyo (JP)

( * ) Notice: Subject to any disclaimer, the term of this patent is extended or adjusted under 35 U.S.C. 154(b) by 543 days.

(21) Appl. No.: 18/275,456

(22) PCT Filed: Feb. 10, 2022

(86) PCT No.: PCT/JP2022/005373
§ 371 (c)(1),
(2) Date: Aug. 2, 2023

(87) PCT Pub. No.: WO2022/176773
PCT Pub. Date: Aug. 25, 2022

(65) Prior Publication Data

US 2024/0117130 A1 Apr. 11, 2024

(30) Foreign Application Priority Data

Feb. 18, 2021 (JP) ................................ 2021-024236

(51) Int. Cl.
*C08J 5/04* (2006.01)
*C08J 5/10* (2006.01)

(52) U.S. Cl.
CPC ................ *C08J 5/042* (2013.01); *C08J 5/10* (2013.01); *C08J 2363/02* (2013.01); *C08J 2377/00* (2013.01)

(58) Field of Classification Search
CPC . C08J 5/042; C08J 5/10; C08J 2363/02; C08J 2377/00
See application file for complete search history.

(56) References Cited

U.S. PATENT DOCUMENTS 6,054,221 A 4/2000 Weigel et al.
8,986,825 B2 3/2015 Mortimer et al.
2013/0184376 A1* 7/2013 Baidak .................. C08G 75/23 523/400
2016/0326301 A1 11/2016 Mason et al.
2017/0326819 A1 11/2017 Meegan et al.
2021/0261744 A1 8/2021 Hondo et al.

FOREIGN PATENT DOCUMENTS

EP 2426157 A1 * 3/2012 ............ C08G 59/50
JP 11511503 A 10/1999
JP 2004315572 A 11/2004
JP 2010150310 A 7/2010
JP 2010163504 A 7/2010
JP 2012041486 A 3/2012
JP 2013521370 A 6/2013
JP 5808057 B2 11/2015
JP 2016147925 A 8/2016
JP 2017506279 A 3/2017
WO 2020008847 A1 1/2020

OTHER PUBLICATIONS

International Search Report and Written Opinion for International Application No. PCT/JP2022/005373, dated May 10, 2022, 5 pages.

* cited by examiner

*Primary Examiner* — Robert S Walters, Jr.

(74) *Attorney, Agent, or Firm* — Buchanan Ingersoll & Rooney PC

(57) ABSTRACT

Provided is an epoxy resin composition and a fiber-reinforced composite material using the epoxy resin composition, where the epoxy resin composition is capable of maintaining a low viscosity while being injected into a reinforcing fiber substrate and is also capable of imparting to a fiber-reinforced composite material high-level physical properties required for use as a structural material even in cases where the temperature increase rate during thermal curing is low, where the epoxy resin composition contains [A] tetraglycidyl diaminodiphenylmethanein an amount of not less than 70% by mass and not more than 90% by mass of total epoxy resin components taken as 100% by mass, [B] a bisphenol F-type epoxy resin in an amount of not less than 10% by mass and not more than 30% by mass by mass of total epoxy resin components taken as 100% by mass, [C] 4,4'-methylenebis(3-chloro-2,6-diethylaniline), and [D] 4,4'-methylenebis(3,3',5,5'-tetraisopropylaniline).

11 Claims, No Drawings

EPOXY RESIN COMPOSITION FOR FIBER-REINFORCED COMPOSITE MATERIAL, FIBER-REINFORCED COMPOSITE MATERIAL, AND METHOD FOR PRODUCING FIBER-REINFORCED COMPOSITE MATERIAL

CROSS REFERENCE TO RELATED APPLICATIONS

This application is the U.S. National Phase of PCT/JP2022/005373, filed Feb. 10, 2022, which claims priority to Japanese Patent Application No. 2021-024236, filed Feb. 18, 2021, the disclosures of these applications being incorporated herein by reference in their entireties for all purposes.

FIELD OF THE INVENTION

The present invention relates to an epoxy resin composition for fiber-reinforced composite material, a fiber-reinforced composite material prepared using the epoxy resin composition, and a method of producing the fiber-reinforced composite material.

BACKGROUND OF THE INVENTION

Fiber-reinforced composite materials consist of reinforcing fibers and a matrix resin and are increasingly used, for example, in the fields of aerospace, sports, and general industry since the advantages of both the reinforcing fibers and the matrix resin can be exploited in material design.

For example, glass fibers, aramid fibers, carbon fibers, or boron fibers can be used as the reinforcing fibers. Either a thermosetting resin or a thermoplastic resin can be used as the matrix resin, but a thermosetting resin is more commonly used than a thermoplastic resin because a thermosetting resin easily infiltrates reinforcing fibers. For example, an epoxy resin, an unsaturated polyester resin, a vinyl ester resin, a phenolic resin, a bismaleimide resin, or a cyanate resin can be used as the thermosetting resin.

A process such as prepreg molding, hand lay-up, filament winding, pultrusion, or RTM (resin transfer molding) is used as the method of forming a fiber-reinforced composite material. The prepreg molding is a process in which reinforcing fibers are impregnated with an epoxy resin composition to prepare a prepreg, the prepreg is laminated into a desired shape, and the laminated prepreg is heated to obtain a molded product. The prepreg molding process is suitable for producing fiber-reinforced composite materials with high material strength required for use as structural materials for aircraft, automobiles, and the like. However, the prepreg molding process should involve many steps, such as prepreg production and prepreg lamination, and is therefore only available for small production runs and is not suitable for mass production and has a productivity problem. The RTM is a process in which a liquid epoxy resin composition is injected into a reinforcing fiber substrate placed in a heated mold, the reinforcing fiber substrate is impregnated with the epoxy resin composition, and the epoxy resin composition is thermally cured in the mold to obtain a cured product. This process not only makes it possible to form a fiber-reinforced composite material using a mold in a short time without the prepreg production step, but also has the advantage of facilitating the formation of a fiber-reinforced composite material with a complex shape.

A one-pack type or two-pack type epoxy resin composition can be used as the liquid epoxy resin composition. The one-pack type epoxy resin composition is an epoxy resin composition in which all components including an epoxy resin and a curing agent are premixed together. In contrast, the two-pack type epoxy resin composition is an epoxy resin composition obtained by mixing two solutions, an epoxy main agent solution and a curing agent solution, together immediately before use, wherein the epoxy main agent solution contains an epoxy resin as a main component and the curing agent solution contains a curing agent as a main component.

In the RTM process, a one-pack type epoxy resin composition is often used. One-pack type epoxy resin compositions are required to simultaneously satisfy the following two conditions when applied to large structural materials such as aircraft main and tail wings. First, the resin should maintain a low resin viscosity for a long time while the resin is injected into a reinforcing fiber substrate to obtain a large structural material with no unimpregnated areas; second, the resin should have the potential to impart to a fiber-reinforced composite material high-level physical properties (heat resistance, high compressive strength, impact resistance, and durability) required for use as a structural material even in cases where the temperature increase rate during thermal curing of a large structural material is low.

In view of these conditions, a one-pack type epoxy resin composition containing methylenebis(3-chloro-2,6-diethylaniline) (M-CDEA) as a curing agent is disclosed, and a method for preventing viscosity increase for a long time is proposed (Patent Literature 1). Also, a one-pack type epoxy resin composition containing a fluorenamine curing agent with a part of the fluorenamine curing agent dispersed as a solid in the epoxy resin composition is disclosed, and a method for preventing viscosity increase for a long time is proposed (Patent Literature 2). Moreover, one-pack type epoxy resin compositions containing either 4,4'-methylenebis(2-isopropyl-6-methylaniline) (M-MIPA) or 4,4'-methylenebis(3,3',5,5'-tetraisopropylaniline) (M-DIPA) are disclosed, and a method is proposed which enables sufficiently fast curing at 180° C. and sufficient resin curing until demolding after molding and high-level fiber-reinforced composite material properties (Patent Literature 3 and 4).

PATENT LITERATURE

Patent Literature 1: JP 5808057 B
Patent Literature 2: JP H11-511503 A
Patent Literature 3: JP 2010-150310 A
Patent Literature 4: WO2020/008847

SUMMARY OF THE INVENTION

In the process described in Patent Literature 1, the viscosity increase can be reduced for a long time. However, methylenebis(3-chloro-2,6-diethylaniline) (M-CDEA), the sole curing agent used in the resin composition, is less reactive and the resin composition is therefore less curable. Therefore, a binder used to bind a reinforcing fiber substrate may be excessively dissolved in the resin when the temperature increase rate during thermal curing is low, resulting in irregular interlayer spacing between layers in a fiber-reinforced composite material and a problem of insufficient compression-after-impact strength.

In the process described in Patent Literature 2, the viscosity increase can be reduced for a long time. However, the fluorenamine curing agent, a part of which is dispersed as a solid, can be aggregated. The aggregate of the curing agent can be filtered by a reinforcing fiber substrate while the resin is injected into the reinforcing fiber substrate. In addition, a part of the fluorenamine curing agent may remain unmelted even at a temperature as high as 180° C. because the melting temperature of the curing agent is as high as 201° C. Therefore, the resin composition is less cured, resulting in a problem of not providing sufficiently high heat resistance.

In the processes described in Patent Literature 3 and Patent Literature 4, the resin composition can be cured in a sufficiently short time, and the resin after the molding process is cured sufficiently to impart high heat resistance and high mechanical properties to a fiber-reinforced composite material. However, in cases where the temperature increase rate during thermal curing is low, the surface of a binder used to bind a reinforcing fiber substrate cannot be fused together with the resin, resulting in low adhesion between the resin and the binder and a problem of not providing sufficient compressive strength, compression-after-impact strength, or microcrack resistance to a fiber-reinforced composite material.

As described above, the two conditions described above are not simultaneously met by any one-pack type epoxy resin compositions of the conventional techniques. Thus, an object of the present invention is to provide an epoxy resin composition capable of maintaining a low viscosity for a long time while being injected into a reinforcing fiber substrate and capable of imparting to a fiber-reinforced composite material high-level physical properties (heat resistance, high compressive strength, impact resistance, and durability) required for use as a structural material even in cases where the temperature increase rate during thermal curing is low. Another object of the present invention is to provide a fiber-reinforced composite material having a high glass transition temperature of the cured resin and a high 0° compressive strength under wet and heat conditions, a high compression-after-impact strength, and a high microcrack resistance by using the epoxy resin composition.

To solve the above problems, an epoxy resin composition according to the present invention for fiber-reinforced composite material is composed as follows. That is an epoxy resin composition for fiber-reinforced composite material, comprising [A] tetraglycidyl diaminodiphenylmethane in an amount of not less than 70% by mass and not more than 90% by mass of total epoxy resin components taken as 100% by mass, and [B] a bisphenol F-type epoxy resin in an amount of not less than 10% by mass and not more than 30% by mass by mass of total epoxy resin components taken as 100% by mass, and [C] 4,4'-methylenebis(3-chloro-2,6-diethylaniline), and [D] 4,4'-methylenebis(3,3',5,5'-tetraisopropylaniline).

In addition, a fiber-reinforced composite material according to the present invention comprises a cured product of the epoxy resin composition of the present invention for fiber-reinforced composite material and a reinforcing fiber substrate.

The present invention can provide an epoxy resin composition for fiber-reinforced composite material capable of maintaining a low viscosity for a long time while the resin is injected into a reinforcing fiber substrate and capable of imparting to a fiber-reinforced composite material high-level physical properties (heat resistance, high compressive stre ngth, impact resistance, and durability) required for use as a structural material even in cases where the temperature increase rate during thermal curing is low.

DETAILED DESCRIPTION OF EMBODIMENTS OF THE INVENTION

Preferred embodiments of the present invention are described below.

First of all, an epoxy resin composition of the present invention for fiber-reinforced composite material is described.

The epoxy resin composition of the present invention for fiber-reinforced composite material comprises [A] tetraglycidyl diaminodiphenylmethane in an amount of not less than 70% by mass and not more than 90% by mass of total epoxy resin components taken as 100% by mass, and [B] a bisphenol F-type epoxy resin in an amount of not less than 10% by mass and not more than 30% by mass by mass of total epoxy resin components taken as 100% by mass, and [C] 4,4'-methylenebis(3-chloro-2,6-diethylaniline), and [D] 4,4'-methylenebis(3,3',5,5'-tetraisopropylaniline). Hereinafter, the components described above may be referred to simply as the component [A], the component [B], the component [C], and the component [D]. Additionally, an epoxy resin composition for fiber-reinforced composite material may be referred to simply as an epoxy resin composition.

An epoxy resin composition comprising the component [A] and component [B] in the number of parts by mass described above and further comprising the component [C] and component [D] is capable of maintaining a low resin viscosity for a long time while the resin is injected into a reinforcing fiber substrate, which has been challenging for conventional techniques, and capable of imparting to a fiber-reinforced composite material high-level physical properties (heat resistance, high compressive strength, impact resistance, and durability) required for use as a structural material even in cases where the temperature increase rate during thermal curing is low.

The component [A] in the present invention is tetraglycidyl diaminodiphenylmethane. The component [A] is a component necessary to impart high heat resistance and high mechanical properties to a cured epoxy resin and a fiber-reinforced composite material. As used herein, the tetraglycidyl diaminodiphenylmethane of the component [A] refers to N,N,N',N'-tetraglycidyl diaminodiphenylmethane, derivatives thereof, or isomers thereof and can be, for example, N,N,N',N'-tetraglycidyl-4,4'-diaminodiphenylmethane, N,N,N',N'-tetraglycidyl-3,3'-dimethyl-4,4'-diaminodiphenylmethane, N,N,N',N'-tetraglycidyl-3,3'-diethyl-4,4'-diaminodiphenylmethane, N,N,N',N'-tetraglycidyl-3,3'-diisopropyl-4,4'-diaminodiphenylmethane, N,N,N',N'-tetraglycidyl-3,3'-di-t-butyl-4,4'-diaminodiphenylmethane, N,N,N',N'-tetraglycidyl-3,3'-dimethyl-5,5'-diethyl-4,4'-diaminodiphenylmethane, N,N,N',N'-tetraglycidyl-3,3'-diisopropyl-5,5'-diethyl-4,4'-diaminodiphenylmethane, N,N,N',N'-tetraglycidyl-3,3'-diisopropyl-5,5'-dimethyl-4,4'-diaminodiphenylmethane, N,N,N',N'-tetraglycidyl-3,3'-di-t-butyl-5,5'-diethyl-4,4'-diaminodiphenylmethane, N,N,N',N'-tetraglycidyl-3,3'-di-t-butyl-5,5'-dimethyl-4,4'-diaminodiphenylmethane, N,N,N',N'-tetraglycidyl-3,3',5,5'-tetramethyl-4,4'-diaminodiphenylmethane, N,N,N',N'-tetraglycidyl-3,3',5,5'-tetraethyl-4,4'-diaminodiphenylmethane, N,N,N',N'-tetraglycidyl-3,3',5,5'-tetraisopropyl-4,4'-diaminodiphenylmethane, N,N,N',N'-tetraglycidyl-3,3',5,5'-tetra-t-butyl-4,4'-diaminodiphenylmethane, N,N,N',N'-tetraglycidyl-3,3'-dichloro-4,4'-diaminodiphenylmethane, or N,N,N',N'-tetraglycidyl-3,3'-dibromo-4,4'-diaminodiphenylmethane.

In addition, the epoxy resin composition of the present invention for fiber-reinforced composite material may comprise two or more of the tetraglycidyl diaminodiphenylmethanes as the component [A].

Commercial tetraglycidyl diaminodiphenylmethane products include, for example, "SUMI-EPDXY®" ELM434 (manufactured by Sumitomo Chemical Co., Ltd.), YH434L (manufactured by Nippon Steel & Sumikin Chemical Co., Ltd.), "jER®" 604 (manufactured by Mitsubishi Chemical Co.), and "Araldite®" MY720 and "Araldite®" MY721 (all manufactured by Huntsman Advanced Materials).

In the present invention, the content of the component [A] should be not less than 70% by mass and not more than 90% by mass of total epoxy resin components taken as 100% by mass. In cases where the content of the component [A] is not less than 70% by mass of total epoxy resin components taken as 100% by mass, a cured epoxy resin will exhibit high heat resistance, and a fiber-reinforced composite material will have higher 0° compressive strength under wet and heat conditions. Moreover, in cases where the content of the component [A] is not more than 90% by mass, the viscosity of the epoxy resin composition at the resin impregnation temperature is reduced and impregnation into a reinforcing fiber substrate is improved. From this point of view, the content of the component [A] is preferably not less than 80% by mass and not more than 90% by mass of total epoxy resin components taken as 100% by mass. It should be noted that a cured epoxy resin in the present invention refers to a cured product obtained by curing the epoxy resin composition.

The component [B] in the present invention is a bisphenol F-type epoxy resin. The component [B] is a component necessary to reduce the viscosity of the epoxy resin composition at the resin impregnation temperature and increase the impregnation into a reinforcing fiber substrate. In addition, the component [B] is a component to impart high mechanical properties to a cured epoxy resin and a fiber-reinforced composite material. As used herein, the bisphenol F-type epoxy resin of the component [B] refers to a bisphenol F having two glycidylated phenolic hydroxyl groups.

Commercial bisphenol F-type epoxy resin products include, for example, jER® 806, "jER®" 807, "jER®" 1750, "jER®" 4004P, "jER®" 4007P, and "jER®" 4009P (all manufactured by Mitsubishi Chemical Co.), "EPICLON®" 830 (manufactured by DIC Co.), "Epotohto®" YDF-170, "Epotohto®" YDF2001, and "Epotohto®" YDF2004 (all manufactured by Nippon Steel & Sumikin Chemical Co., Ltd.), and "Araldite®" GY282 (manufactured by Huntsman Japan K.K.).

In the present invention, the resin viscosity $\eta$ (mPa·s) of the component [B] at 50° C. is preferably in the following range: $1000 \le \eta \le 10000$. In cases where the $\eta$ is not less than 1000 mPa·s, the viscosity at the resin injection temperature is prevented from dropping too much, and unimpregnated areas are unlikely to form due to the presence of pits created by entrained air during impregnation of a reinforcing fiber substrate. In addition, the high reactivity of the epoxy resin composition at the resin injection temperature results in increased viscosity during the injection process and reduced impregnation property, which can cause molding difficulties, such as the formation of unimpregnated areas and long molding time. However, in cases where the $\eta$ is not more than 10000 mPa·s, the viscosity at the resin injection temperature is low enough to improve impregnation into a reinforcing fiber substrate and reduce the formation of unimpregnated areas. From this point of view, the resin viscosity $\eta$ (mPa·s) is more preferably in the following range: $1000 \le \eta \le 8000$. Commercial resin products with a resin viscosity $\eta$ (mPa·s) in the above range include, for example, "EPICLON®" 830 (manufactured by DIC Co.) and "Araldite®" GY282 (manufactured by Huntsman Japan K.K.). It should be noted that the resin viscosity $\eta$ (mPa·s) in the present invention is measured by using a B-type viscometer in accordance with JIS Z8803 (1991) "Method for viscosity measurement by a cone-plate rotating viscometer". In addition, commercial tetramethyl bisphenol F-type epoxy resin products that are alkyl-substituted derivatives, include, for example, "Epotohto®" YSLV-80XY (manufactured by Nippon Steel & Sumikin Chemical Co., Ltd.).

In the present invention, the content of the component [B] should be not less than 10% by mass and not more than 30% by mass of total epoxy resin components taken as 100% by mass. In cases where the content of the component [B] is not less than 10 parts by mass of total epoxy resin components taken as 100% by mass, the viscosity of the epoxy resin composition at the resin impregnation temperature is reduced and impregnation into a reinforcing fiber substrate is improved, preventing the formation of unimpregnated areas and also providing high toughness and high elastic modulus to a cured epoxy resin. Moreover, in cases where the content of the component [B] is not more than 30% by mass, high heat resistance is achieved. From this point of view, the content of the component [B] is preferably not less than 10% by mass and not more than 25% by mass of total epoxy resin components taken as 100% by mass.

In addition, the epoxy resin composition of the present invention for fiber-reinforced composite material may contain an epoxy resin other than the components [A] and [B] in a concentration of not more than 20% by mass of total epoxy resin components taken as 100% by mass. Examples of the epoxy resin other than the components [A] and [B] include a bisphenol-type epoxy resin other than the component [B], a phenol novolac-type epoxy resin, a cresol novolac-type epoxy resin, a resorcinol-type epoxy resin, a phenol aralkyl-type epoxy resin, a naphthol aralkyl-type epoxy resin, a dicyclopentadiene-type epoxy resin, an epoxy resin having the biphenyl skeleton, an isocyanate-modified epoxy resin, a tetraphenylethane-type epoxy resin, a triphenyl methane-type epoxy resin, and a triglycidyl amine-type epoxy resin. The epoxy resin composition of the present invention for fiber-reinforced composite material may comprise one or two or more of the epoxy resins other than the components [A] and [B].

More specific examples of the epoxy resin other than the components [A] and [B] include bisphenol A diglycidyl ether, tetrabromobisphenol A diglycidyl ether, bisphenol AD diglycidyl ether, 2,2',6,6'-tetramethyl-4,4'-biphenol diglycidyl ether, 9,9-bis(4-hydroxyphenyl)fluorene diglycidyl ether, tris(p-hydroxyphenyl)methane triglycidyl ether, tetrakis(p-hydroxyphenyl)ethane tetraglycidyl ether, phenol novolac glycidyl ether, cresol novolac glycidyl ether, phenol-dicyclopentadiene condensate glycidyl ether, biphenylaralkyl resin glycidyl ether, triglycidyl isocyanurate, 5-ethyl-1,3-diglycidyl-5-methylhydantoin, oxazolidone-type epoxy resins obtained by addition or a bisphenol A diglycidyl ether and tolylene isocyanate, phenol-aralkyl-type epoxy resins, and triglycidyl aminophenol. Among others, a bisphenol-type epoxy resin other than the component [B] easily make a large contribution to the balance between toughness and heat resistance of a cured epoxy resin and is therefore suitable for use. In particular, a liquid bisphenol-type epoxy resin contributes greatly to the impregnation of reinforcing fibers and is therefore suitable for use as an epoxy resin other than the components [A] and [B]. In the present invention, the term "liquid" refers to a viscosity of not more than 1000 Pas at 25° C. In addition, the term "solid" refers to a lack of flowability at 25° C. or a very low flowability, specifically, a viscosity of more than 1000 Pas at 25° C. In this respect, the viscosity is measured by using an E-type viscometer (for example, TVE-30H manufactured by TOKIMEC Inc.) equipped with a standard cone rotor (1° 34'×R24) in accordance with JIS Z8803 (1991) “Method for viscosity measurement by a cone-plate rotating viscometer”.

As used herein, the “bisphenol-type epoxy resin other than the component [B]” means a bisphenol compound, other than bisphenol F, having two glycidyl-substituted phenolic hydroxyl groups. Examples of the bisphenol-type epoxy resin other than the component [B] include a bisphenol A-type epoxy resin, a bisphenol AD-type epoxy resin, a bisphenol S-type epoxy resin, and derivatives of the bisphenol-type epoxy resins containing a halogenated bisphenol moiety, an alkylated bisphenol moiety, or a hydrogenated bisphenol moiety. In addition, bisphenol-type epoxy resins are not limited to monomers, and high-molecular-weight polymers composed of repeating units are suitable for use as bisphenol-type epoxy resins. In view of the balance between toughness and heat resistance of a cured epoxy resin, the content of a bisphenol-type epoxy resin other than the component [B], if any, is preferably not more than 20% by mass of total epoxy resin components taken as 100% by mass.

Commercial bisphenol A-type epoxy resin products include, for example, jER® 825, “jER®” 826, “jER®” 827, “jER®” 828, “jER®” 834, “jER®” 1001, “jER®” 1002, “jER®” 1003, “jER®” 1004, “jER®” 1004AF, “jER®” 1007, and “jER®” 1009 (all manufactured by Mitsubishi Chemical Co.), “EPICLON®” 850 (manufactured by DIC Co.), “Epotohto®” YD-128 (manufactured by Nippon Steel & Sumikin Chemical Co., Ltd.), and “DER®”-331 and “DER®”-332 (manufactured by The Dow Chemical Co.).

Commercial bisphenol S-type epoxy resin products include, for example, “EPICLON®” EXA-1515 (manufactured by DIC Co.).

The component [C] in the present invention is 4,4'-methylenebis(3-chloro-2,6-diethylaniline). The component [C] is a component necessary to maintain a low resin viscosity for a long time while the resin is injected into a reinforcing fiber substrate and to impart high mechanical properties to a cured epoxy resin and a fiber-reinforced composite material. Commercial 4,4'-methylenebis(3-chloro-2,6-diethylaniline) products include, for example, “Lonzacure®” M-CDEA (manufactured by Lonza K.K.).

In the present invention, the content of the component [C] is preferably not less than 60% by mass and not more than 90% by mass of total curing agent components taken as 100% by mass. In cases where the content of the component [C] is not less than 60% by mass of total curing agent components taken as 100% by mass, the reactivity of the epoxy resin composition tends to be moderately reduced, and the resin viscosity is likely to be kept low for quite a long time while the resin is being injected into a reinforcing fiber substrate. Moreover, in cases where the content of the component [C] is not more than 90% by mass, a binder used to bind a reinforcing fiber substrate can easily maintain the shape without being excessively dissolved in the resin when the temperature increase rate during thermal curing is low. Therefore, a consistent interlayer thickness that allows sufficient plastic deformation is easily maintained in a fiber-reinforced composite material, which easily provides sufficient compression-after-impact strength. From this point of view, the content of the component [C] is preferably not less than 70% by mass and not more than 90% by mass of total curing agent components taken as 100% by mass.

The component [D] in the present invention is 4,4'-methylenebis(3,3',5,5'-tetraisopropylaniline). The component [D] is a component necessary to impart high heat resistance and high mechanical properties to a cured epoxy resin and a fiber-reinforced composite material. Commercial 4,4'-methylenebis(3,3',5,5'-tetraisopropylaniline) products include, for example, “Lonzacure®” M-DIPA (manufactured by Lonza K.K.).

In the present invention, the content of the component [D] is preferably not less than 5% by mass and not more than 40% by mass of total curing agent components taken as 100% by mass. In cases where the content of the component [D] is not less than 5% by mass of total curing agent components taken as 100% by mass, high heat resistance is easily achieved. Moreover, in cases where the content of the component [D] is not more than 40% by mass, the surface of a binder used to bind a reinforcing fiber substrate is fused together with the resin when the temperature increase rate during thermal curing is low, which easily results in high adhesion between the resin and the binder and easily provides sufficient compressive strength, compression-after-impact strength, or microcrack resistance. From this point of view, the content of the component [D] is more preferably not less than 5% by mass and not more than 30% by mass of total curing agent components taken as 100% by mass.

Preferably, the epoxy resin composition of the present invention for fiber-reinforced composite material further comprises [E] 4,4'-methylenebis(2-isopropyl-6-methylaniline). Hereinafter, [E] 4,4'-methylenebis(2-isopropyl-6-methylaniline) may be referred to simply as the component [E]. The presence of the component [E] can easily result in higher heat resistance and higher mechanical properties of a cured epoxy resin and a fiber-reinforced composite material. Commercial 4,4'-methylenebis(2-isopropyl-6-methylaniline) products include, for example, “Lonzacure®” M-MIPA (manufactured by Lonza K.K.).

In cases where the epoxy resin composition of the present invention for fiber-reinforced composite material comprises a component [E], the content of the component [E] is preferably not less than 5% by mass and not more than 20% by mass of total curing agent components taken as 100% by mass. In cases where the content of the component [E] is not less than 5% by mass of total curing agent components taken as 100% by mass, the heat resistance and compressive strength of a fiber-reinforced composite material is easily further increased. Moreover, in cases where the content of the component [E] is not more than 20% by mass, the epoxy resin composition provides excellent handling ability, as evidenced by a smaller amount of the component [E] being separated even when a homogeneous solution of the component [E] in the epoxy resin composition is stored frozen for a long time. In addition, high-temperature fast curing is easily achieved at 180° C. From this point of view, the content of the component [E] is more preferably not less than 5% by mass and not more than 15% by mass of total curing agent components taken as 100% by mass.

Additionally, the epoxy resin composition of the present invention for fiber-reinforced composite material may contain a compound having an active group capable of reacting with an epoxy resin as a curing agent other than the components [C], [D], and [E]. Examples of the active group capable of reacting with an epoxy resin include amino and acid anhydride groups. Though an epoxy resin composition with higher storage stability is more preferable, the curing agent other than the components [C], [D], and [E] is preferably a solid at room temperature because a liquid curing agent is generally highly reactive.

Preferably, the curing agent other than the components [C], [D], and [E] is an aromatic amine. In addition, the curing agent other than the components [C], [D], and [E] is more preferred to have one to four phenyl groups in the molecule from the viewpoint of heat resistance and mechanical properties. Furthermore, an aromatic polyamine compound in which at least one phenyl group in the backbone of the curing agent for the epoxy resin is a phenyl group containing an amino group at the ortho or meta position is even more preferred because the flexibility derived from the molecular backbone of such a compound can help increase the elastic modulus of the resin and improve the mechanical properties.

Specific examples of the aromatic polyamine compound include meta-phenylenediamine, diaminodiphenylmethane, diaminodiphenyl sulfone, meta-xylylenediamine, diphenyl-p-dianiline, derivatives thereof, such as alkyl-substituted derivatives thereof, and isomers thereof differing in the position of the amino groups. These curing agents can be used singly or in combination of two or more thereof. Diaminodiphenylmethane and diaminodiphenyl sulfone, among others, are preferred for imparting high heat resistance to a cured epoxy resin.

Commercial aromatic polyamine compound-based curing agents include, for example, Seika Cure-S (manufactured by Wakayama Seika Kogyo Co., Ltd.), MDA-220 (manufactured by Mitsui Chemicals, Inc.), "jER Cure®" W (manufactured by Mitsubishi Chemical Co.), and 3,3'-DAS (manufactured by Mitsui Chemicals, Inc.), "Lonzacure®" M-DEA (manufactured by Lonza K.K.), "KAYAHARD®" A-A(PT) (manufactured by Nippon Kayaku Co., Ltd.), and "Lonzacure®" DETDA 80 (manufactured by Lonza K.K.).

Additionally, the epoxy resin composition of the present invention for fiber-reinforced composite material may comprise, for example, a curing accelerator, a plasticizer, a colorant, a pigment, an inorganic filler, an antioxidant, an ultraviolet absorber, a coupling agent, and a surfactant, if necessary, as auxiliary components.

The epoxy resin composition of the present invention for fiber-reinforced composite material can be prepared as a composition comprising the components [A], [B], [C], and [D] immediately before being injected into a reinforcing fiber substrate for impregnation; a single composition comprising all of the components or multiple compositions comprising an arbitrarily selected component can be stored as the epoxy resin composition of the present invention. An example of storing the epoxy resin composition of the present invention as multiple compositions is described below: The epoxy resin composition of the present invention can be stored as two separate compositions, an epoxy main agent solution comprising the components [A] and [B] and a curing agent mixture comprising the components [C] and [D], and a composition comprising all of the components can be prepared for use by mixing the epoxy main agent solution and the curing agent mixture immediately prior to injecting the composition into a reinforcing fiber substrate for impregnation. When the epoxy resin composition of the present invention is stored as multiple compositions, each composition can be a combination of arbitrarily selected elements from the set of the components. In the case where the epoxy resin composition of the present invention is stored as multiple compositions, the components [A] and [B] which are epoxy resins and the components [C] and [D] which are curing agents are preferable combinations of components contained in different compositions to prevent viscosity increase due to a curing reaction.

In the present invention, the ratio H/E of the total number of active hydrogens in the amine compounds contained in the curing agents (H) to the total number of epoxy groups in the epoxy resins (E) is preferably not less than 1.1 and not more than 1.4. More preferably, the H/E ratio is not less than 1.1 and not more than 1.3. In cases where the H/E ratio is not less than 1.1, the effect of increasing the plastic deformation capacity of a cured epoxy resin is easily obtained. Moreover, in cases where the H/E ratio is not more than 1.4, high heat resistance is easily achieved.

The total amount of the components [A] to [D] in the epoxy resin composition of the present invention for fiber-reinforced composite material is preferably in the range of 70 to 100% by mass, more preferably in the range of 80 to 100% by mass, because the effect of the present invention is significantly achieved in the above ranges.

The epoxy resin composition of the present invention for fiber-reinforced composite material can comprise core-shell rubber particles. Advantageously, the toughness of a fiber-reinforced composite material is easily increased by core-shell rubber particles. As used herein, the term "core-shell rubber particles" refers to particles comprising a core particle composed mainly of a polymer such as a crosslinked rubber and a coating that partially or completely covers the surface of the core with a polymer different from that of the core, wherein the coating is formed by, for example, graft polymerization.

In the core-shell rubber particles, the core component is, for example, a polymer prepared by polymerizing one or more monomers selected from the group consisting of conjugated diene monomers, acrylate monomers, and methacrylate monomers, or a silicone resin. Specific examples of the conjugated diene monomer include butadiene, isoprene, and chloroprene. A crosslinked polymer composed of one or more of these conjugated diene monomers is a preferred polymer used as a core component. Butadiene is preferably used as such a conjugated diene monomer, particularly because of the good properties of a resulting polymer and simple polymerization processes, that is, a polymer prepared by polymerizing monomers including butadiene is a preferred polymer used as a core component.

The shell in the core-shell rubber particles is formed on the core by graft polymerization and is preferably chemically bonded to the polymer particles as the core component. The shell component is a polymer prepared by polymerizing one or more selected from the group consisting of, for example, (meth)acrylate esters and aromatic vinyl compounds. In addition, the shell component preferably has a functional group that reacts with a component of the epoxy resin composition of the present invention for fiber-reinforced composite material, that is, an epoxy resin or a curing agent for the epoxy resin, because such a functional group easily stabilizes the dispersion of the core-shell rubber particles. The presence of such a functional group increases the compatibility with the epoxy resin or may eventually react with the epoxy resin composition and be incorporated into a cured epoxy resin, which can increase the dispersibility of the core-shell rubber particles. As a result, the addition of even a small amount of such core-shell rubber particles is sufficiently effective in increasing toughness and can increase the toughness while maintaining the glass transition temperature Tg and modulus of elasticity. Examples of the functional group include hydroxyl, carboxyl, and epoxy groups. Epoxy group is preferred among others, because the presence of epoxy group in the shell increases the compatibility between the shell and the epoxy resin composition of the present invention, which can increase the dispersibility of the core-shell rubber particles. Thus, the core-shell rubber particles are preferably core-shell rubber particles having an epoxy group in the shell.

Examples of a method of introducing such a functional group into the shell include a method in which one or more components selected from, for example, acylate and methacrylate esters containing such a functional group are used as part of the monomers for graft polymerization on the core surface.

The core-shell rubber particles preferably have a volume average particle diameter of not less than 50 nm and not more than 300 nm, more preferably a volume average particle diameter of not less than 50 nm and not more than 150 nm. In this respect, the volume average particle diameter is measured by using a NANOTRAC particle size distribution analyzer (manufactured by Nikkiso Co., Ltd.; dynamic light scattering method). In cases where the volume average particle diameter of core-shell rubber particles cannot be measured by a NANOTRAC particle size distribution analyzer, a thin section of a cured epoxy resin is prepared with a microtome and then observed under a TEM to obtain a TEM image, and the obtained image is analyzed by using an image processing software program to measure the volume average particle diameter. In this case, the diameters of at least 100 particles should be used to determine the volume average particle diameter. In cases where the volume average particle diameter is not less than 50 nm, the core-shell rubber particles have an energetic advantage due to the relatively small specific surface area and therefore rarely aggregate and are highly effective in increasing toughness. On the other hand, in cases where the volume average particle diameter is not more than 300 nm, the core-shell rubber particles are relatively closely dispersed and are highly effective in increasing toughness.

More preferably, the epoxy resin composition of the present invention for fiber-reinforced composite material comprises core-shell rubber particles having epoxy groups in the shell, and the volume average particle diameter of the core-shell rubber particles is not less than 50 nm and not more than 300 nm. That is, it is more preferred that the epoxy resin composition of the present invention for fiber-reinforced composite material further comprise [F] core-shell rubber particles having a volume average particle diameter of not less than 50 nm and not more than 300 nm and having epoxy groups in the shell. Hereinafter, [F] core-shell rubber particles having a volume average particle diameter of not less than 50 nm and not more than 300 nm and having epoxy groups in the shell are referred to simply as the component [F]. When the core-shell rubber particles satisfy the above conditions, the addition of the core-shell rubber particles to the epoxy resin composition for fiber-reinforced composite material easily forms a particularly uniform and thorough dispersion and is highly effective in increasing the toughness of the epoxy resin composition.

The production of the core-shell rubber particles is not limited to a specific method, and core-shell rubber particles produced by a known method can be used. For example, "PARALOID®" EXL-2655 (manufactured by Rohm and Haas Company), which comprises a butadiene-alkyl methacrylate-styrene copolymer, "Stafyroid®" AC-3355 or TR-2122 (manufactured by Ganz Chemical Co., Ltd.), which comprises an acrylate-methacrylate ester copolymer, or "PARALOID®" EXL-2611 or EXL-3387 (manufactured by Rohm and Haas Company), which comprises a butyl acrylate-methyl methacrylate copolymer, may be used as a commercial core-shell rubber particle product. In addition, core-shell rubber particles with a trilayer structure can also be used, wherein a core made of a glassy polymer having a glass transition temperature equal to or higher than room temperature, such as Stafyroid IM-601 or IM-602 (all manufactured by Ganz Chemical Co., Ltd.) is covered with an intermediate layer made of a rubbery polymer having a low Tg and further covered with a shell to form the trilayer structure. Typically, these core-shell rubber particles supplied as pellets are ground and the resulting core-shell rubber particles in powder form are used. The powder of core-shell rubber particles is often redispersed in a thermosetting resin composition. However, this method has the problem that the particles are difficult to be stably dispersed without aggregation, that is, in the form of primary particles. To address this problem, a good dispersion state can be attained by using core-shell rubber particles that have not been supplied as pellets during the production of the core-shell rubber particles and can eventually be treated as a component of a thermosetting resin, such as core-shell rubber particles available in masterbatch form dispersed in an epoxy resin in the form of primary particles. Such core-shell rubber particles available in masterbatch form can be produced by, for example, any of the methods described in Examples 1 to 3 in JP 2004-315572 A. In the production methods, a suspension of dispersed core-shell rubber particles is first prepared by using a method represented by emulsion polymerization, dispersion polymerization, and suspension polymerization, in which the polymerization of a core-shell rubber is carried out in an aqueous medium. Next, the suspension is mixed with an organic solvent that is partially soluble in water, such as a ketone solvent such as acetone or methyl ethyl ketone, or an ether solvent such as tetrahydrofuran or dioxane, and the resulting mixture is then brought into contact with a water-soluble electrolyte, such as sodium chloride or potassium chloride, to induce phase separation between organic solvent and aqueous layers. By removing the aqueous layer, the organic solvent is recovered as a dispersion of core-shell rubber particles. The organic layer is then mixed with an epoxy resin, and the organic solvent in the resulting mixture is removed by evaporation to obtain a masterbatch in which the core-shell rubber particles are dispersed in the epoxy resin in the form of primary particles. As a core-shell rubber particle-dispersed epoxy masterbatch produced by the method described above, "Kane Ace®" marketed by Kaneka Corporation can be used.

In cases where the epoxy resin composition of the present invention for fiber-reinforced composite material comprises the component [F], the content of the component [F] is preferably not less than 1 part by mass and not more than 10 parts by mass, more preferably not less than 1 part by mass and not more than 8 parts by mass, of total epoxy resin components taken as 100 parts by mass. In cases where the content of the component [F] is not less than 1 part by mass, a cured epoxy resin with high toughness is more likely to be produced. Moreover, in cases where the content of the component [F] is not more than 10 parts by mass, a cured epoxy resin with a high elastic modulus is more likely to be produced, and the dispersion of the core-shell rubber particles in the resin is also more likely to be increased. It should be noted that in the case of core-shell rubber particles having epoxy groups, the core-shell rubber particles are not a component of the epoxy resin.

As a method of mixing the epoxy resin composition for fiber-reinforced composite material with core-shell rubber particles, a commonly used dispersion method can be used. Examples of the method include methods using a three-roll bender, ball mill, bead mill, jet mill, homogenizer, planetary centrifugal mixer, or the like. In addition, a method of mixing a core-shell rubber particle-dispersed epoxy masterbatch as described above is preferable for use. However, core-shell rubber particles dispersed as primary particles may reaggregate if the core-shell rubber particles are heated more than necessary or the viscosity is reduced. Therefore, the dispersion or blending of the core-shell rubber particles and the mixing or kneading of the core-shell rubber particles with other components after the dispersion are preferably carried out in a temperature range or a viscosity range that prevents the core-shell rubber particles from reaggregating. Specifically, the mixture of the epoxy resin composition for fiber-reinforced composite material and the core-shell rubber particles is preferably kneaded, for example, at a temperature of less than 150° C., although the temperature varies depending on the composition, because the viscosity of the composition may be reduced and the core-shell rubber particles may aggregate if the kneading is performed at a temperature of 150° C. or higher. However, in cases where the temperature reaches 150° C. or higher during the curing process, reaggregation of the core-shell rubber particles is prevented by the gelation that occurs as the temperature rises, and therefore the temperature can be allowed to exceed 150° C.

In the epoxy resin composition of the present invention for fiber-reinforced composite material, the resin viscosity $\pi$ (mPa·s) is preferably within the following range: $20 \leq \eta \leq 200$ when measured with an E-type viscometer after heating under isothermal conditions at 120° C. for 240 minutes. In cases where the $\eta$ is not less than 20 mPa·s, the viscosity at the resin injection temperature is prevented from dropping too much, and unimpregnated areas are unlikely to form due to the presence of pits created by entrained air during impregnation of a reinforcing fiber substrate. In addition, the high reactivity of the epoxy resin composition at the resin injection temperature results in increased viscosity during the injection process and reduced impregnation property, which can cause molding difficulties, such as the formation of unimpregnated areas and long molding time. However, in cases where the $\eta$ is not more than 200 mPa·s, the viscosity at the resin injection temperature is low enough to improve impregnation into a reinforcing fiber substrate and reduce the formation of unimpregnated areas. From this point of view, the resin viscosity 11 (mPa·s) is more preferably in the following range: $20 \leq \eta \leq 180$. In the present invention, the viscosity is measured at a rotation speed of 50 rpm by using an E-type viscometer (TVE-30H manufactured by Tokyo Keiki Inc.) equipped with a standard cone rotor (1°34'×R24) in accordance with JIS Z8803 (1991) "Method for viscosity measurement by a cone-plate rotating viscometer".

The epoxy resin composition of the present invention for fiber-reinforced composite material preferably gels in the temperature range of 170° C. to 185° C. when the epoxy resin composition is heated from 70° C. at a temperature increase rate of 0.5° C./min. In this context, the gelation of the epoxy resin composition refers to a lack of flowability caused by the reaction between an epoxy resin, among other resins, and a curing agent. Specifically, a thermal curing analyzer such as ATD-1000 (manufactured by Alpha Technologies) is used to measure the dynamic viscoelasticity of the epoxy resin composition with heating from 70° C. at a temperature increase rate of 0.5° C./min. The gelation temperature is the temperature at which the complex viscosity, which is determined from the torque that increases as the curing reaction proceeds, reaches $1.0 \times 10^5$ Pa·s. In cases where the gelation temperature is 170° C. or higher, the gelation temperature is more likely to be higher than the melting temperature of a binder used to bind a reinforcing fiber substrate. In cases where the gelation temperature is higher than the melting temperature of the binder, the binder used to bind a reinforcing fiber substrate begins to melt at a temperature lower than the gelation temperature of the epoxy resin composition and the polyamide molecular chains are relaxed. The epoxy resin composition penetrates into the space between the relaxed polyamide molecular chains, and the epoxy resin is gelled and then cured. The resulting entanglement of the resin with the polyamide molecular chains results in an increased interfacial adhesion strength, which tends to increase the compressive strength, impact resistance, and microcrack resistance. Moreover, in cases where the gelation temperature is 185° C. or lower, the gelation temperature is not too high compared to the melting temperature of a binder used to bind a reinforcing fiber substrate. In this case, the binder used to bind a reinforcing fiber substrate can maintain the shape without being excessively dissolved in the resin. Therefore, a consistent interlayer thickness that allows sufficient plastic deformation can be maintained in a fiber-reinforced composite material, which easily provides sufficient compression-after-impact strength. From this point of view, the gelation temperature is more preferably not less than 175° C. and not more than 185° C.

When the epoxy resin composition of the present invention for fiber-reinforced composite material is cured at 180° C. for 120 minutes, the resulting cured epoxy resin preferably has a glass transition temperature Tg of 170° C. or higher and 190° C. or lower. The heat resistance of a fiber-reinforced composite material depends on the glass transition temperature of a cured epoxy resin, which is obtained by curing the epoxy resin composition. If the Tg of a cured epoxy resin is set at a temperature of 170° C. or higher, the cured epoxy resin is more likely to be heat resistant. In addition, setting the Tg of the cured epoxy resin at a temperature of 190° C. or lower reduces cure shrinkage in the epoxy resin composition and also more likely prevents loss of surface quality in a fiber-reinforced composite material from due to the difference in thermal expansion between the epoxy resin composition and the reinforcing fibers. Moreover, the glass transition temperature Tg of a cured epoxy resin is more preferably 175° C. or higher and 190° C. or lower from the viewpoint of heat resistance and surface quality. The glass transition temperature Tg of a cured epoxy resin, which is obtained by curing the epoxy resin composition, is determined by measurement using a dynamic mechanical analyzer (DMA). That is, a rectangular test piece cut from a cured resin plate is used for DMA analysis under temperature elevation, and the temperature at the inflection point of the resulting storage elastic modulus G' curve is determined as the Tg of the cured resin. The measurement conditions are as described in Examples.

A fiber-reinforced composite material of the present invention comprises a cured product of the epoxy resin composition of the present invention for fiber-reinforced composite material and a reinforcing fiber substrate.

The fiber-reinforced composite material of the present invention can be obtained, for example, by injecting the epoxy resin composition comprising epoxy resins and curing agents into a reinforcing fiber substrate placed in a heated mold for impregnation and curing the epoxy resin composition in the mold. In terms of productivity and shape flexibility of a molded product, the RTM process is preferably used as a specific molding process, as described above. In addition, a mold with multiple injection ports is used in the process for the production of such fiber-reinforced composite materials. Preferably, suitable conditions, such as simultaneous injection of the epoxy resin composition through the multiple injection ports or sequential injection of the epoxy resin composition through different injection ports with time intervals, are selected depending on the properties of a desired fiber-reinforced composite material, because such selection of conditions provides a degree of freedom for molding of products of various shapes and sizes. The number and shape of the injection ports are not limited, but it is convenient that more injection ports enable the injection to be completed in a shorter time, and it is preferred that the injection ports be positioned to provide a short flow length of the resin depending on the shape of a molded article.

As the reinforcing fiber substrate used in the fiber-reinforced composite material, a preform is often used which is prepared by layering sheet-like substrates of a woven fabric made of reinforcing fibers, stabilizing the layered substrates with a hot-melt binder (tackifier), and forming the layered substrates into a shape similar to that of a desired product. As the hot melting binder, either a thermoplastic resin or a thermosetting resin can be used. The binder is not limited to a particular form, and the binder can take a form of film, tape, long fiber, short fiber, spun yarn, woven fabric, knitted fabric, nonwoven fabric, net, particulate, or the like. Among others, a particulate or nonwoven fabric form of binder is particularly suitable for use. In this respect, a particulate form of binder is referred to as a binder particle, and a nonwoven form of binder is referred to as a binder nonwoven fabric.

In cases where a particulate form is taken as the form of the binder, the mean particle diameter of the binder is preferably not less than 10 μm and not more than 500 μm. Mean particle diameter here refers to median diameter. The mean particle diameter of binder particles can be measured, for example, by using a laser diffraction particle size distribution analyzer or the like. In case where the mean particle diameter is not less than 10 μm, a higher adhesion strength and greater usability are easily achieved in the resulting preform. From this point of view, the mean particle diameter is more preferably not less than 30 μm. In case where the mean particle diameter is not more than 500 μm, the reinforcing fibers are less wavy in the resulting preform, and higher mechanical properties are easily achieved in the fiber-reinforced composite material. From this point of view, the mean particle diameter is more preferably not more than 300 μm.

In cases where a nonwoven form is taken as the form of the binder, the constitutive fibers in the nonwoven fabric preferably have an average diameter of not less than 10 μm and not more than 300 μm. In this respect, the average diameter is the arithmetic mean calculated from the diameters of 100 randomly selected fibers measured by observing a cross section of the binder nonwoven fabric under a scanning electron microscope. In cases where the cross section of a fiber is not a perfect circle, the minor axis of the cross section will be measured as the diameter of the fiber. In cases where the average diameter is not less than 10 μm, a higher adhesion strength is easily achieved in the resulting preform. In cases where the average diameter is not more than 300 μm, the reinforcing fibers are less wavy in the resulting preform, and higher mechanical properties are easily achieved in the fiber-reinforced composite material. From this point of view, the average diameter is more preferably not more than 100 μm.

The binder is applied to at least the surface of a reinforcing fiber substrate, and the resulting reinforcing fiber substrate with binder is used. In addition, a reinforcing fiber substrate with binder carries the binder at least on the surface and is used in a preform.

In the fiber-reinforced composite material of the present invention, the reinforcing fiber substrate is preferably a preform bonded by a nonwoven form of binder. When a reinforcing fiber substrate is a preform bonded by a nonwoven form of binder, the binder can be uniformly deposited on the substrate, providing an impregnation channel for an epoxy resin composition. Due to the impregnation channel, the impregnation is significantly increased and far fewer voids are created. In addition, even if a smaller amount of the binder is applied than the amount of a particulate form of binder, the stabilizing effect on the shape of the resulting preform can be equally maintained, and the high heat resistance and high mechanical properties inherent in the matrix resin are exhibited in the resulting fiber-reinforced composite material.

In the fiber-reinforced composite material of the present invention, the temperature at which an epoxy resin composition for fiber-reinforced composite material gels when heated from 70° C. at a temperature increase rate of 0.5° C./min to produce a cured product of the epoxy resin composition for fiber-reinforced composite material is preferably equal to or higher than the melting temperature of a binder used to bind a reinforcing fiber substrate. The difference between the gelation temperature and the melting temperature (gelation temperature-melting temperature) is more preferably 1° C. or higher and still more preferably 4° C. or higher. In addition, the difference between the gelation temperature and the melting temperature is preferably 20° C. or lower and more preferably 15° C. or lower. In cases where the temperature difference is in the above range, the binder used to bind a reinforcing fiber substrate begins to melt at a temperature lower than the gelation temperature of the epoxy resin composition and the polyamide molecular chains are relaxed. The epoxy resin composition penetrates into the space between the relaxed polyamide molecular chains, and the epoxy resin is gelled and then cured. The resulting entanglement of the resin with the polyamide molecular chains results in an increased interfacial adhesion strength, which tends to increase the compressive strength, impact resistance, and microcrack resistance. Moreover, the binder used to bind a reinforcing fiber substrate can maintain the shape without being excessively dissolved in the resin. Therefore, a consistent interlayer thickness that allows sufficient plastic deformation can be maintained in a fiber-reinforced composite material, which easily provides sufficient compression-after-impact strength.

In the fiber-reinforced composite material of the present invention, the nonwoven form of the binder is preferably composed of a polyamide having a melting temperature of 165° C. or higher and 180° C. or lower. In cases where the melting temperature of the polyamide is 165° C. or higher, the shape can be maintained during curing, which helps maintain a consistent interlayer thickness that allows sufficient plastic deformation and, together with the discontinuous phase of the nonwoven fabric, facilitates efficient crack prevention and is eventually more likely to provide high impact resistance. In cases where the melting temperature of the polyamide is 180° C. or lower, the melting temperature of the polyamide is more likely to be lower than the gelation temperature of the epoxy resin composition. In cases where the melting temperature of the polyamide is lower than the gelation temperature of the epoxy resin composition, the polyamide begins to melt at a temperature lower than the gelation temperature of the epoxy resin composition and the polyamide molecular chains are relaxed. The epoxy resin composition penetrates into the space between the relaxed polyamide molecular chains, and the epoxy resin is gelled and then cured. The resulting entanglement of the resin with the polyamide molecular chains results in an increased interfacial adhesion strength, which may further increase the compressive strength, impact resistance, and microcrack resistance.

In the fiber-reinforced composite material of the present invention, the nonwoven form of the binder is preferably applied to one or both surfaces of a reinforcing fiber substrate.

In the fiber-reinforced composite material of the present invention, the amount of the nonwoven form of the binder applied to the surface of the reinforcing fiber substrate is preferably not less than 0.5 g/m$^2$ and not more than 10 g/m$^2$ on each side. The amount of the binder applied is more preferably not less than 1 g/m$^2$ and not more than 7 g/m$^2$. In cases where the amount of the binder applied is not less than 0.5 g/m$^2$, the shape is easily stabilized in the resulting preform. Moreover, in cases where the amount of the binder applied is not more than 10 g/m$^2$, the matrix resin is more likely to have a sufficient impregnation property, and far fewer voids are created. Furthermore, in cases where a nonwoven form is taken as the form of the binder, as described above, a smaller amount of the binder can be applied than that of a particulate form of a binder to maintain the same effect. Specifically, the amount of a normal binder, such as a particulate form of binder, applied to the surface is not less than 0.5 g/m$^2$ and not more than 50 g/m$^2$ on each side, and preferably not less than 1 g/m$^2$ and not more than 30 g/m$^2$ on each side, while the amount of a nonwoven form of binder applied to the surface can be reduced to an amount of not less than 0.5 g/m$^2$ and not more than 10 g/m$^2$, while maintaining the stabilizing effect on the shape of the resulting preform.

Examples of a method of producing a preform include a method comprising layering a reinforcing fiber substrate with binder, which carries the binder at least on the surface, and stabilizing the shape of the reinforcing fiber substrate with binder. More specifically, the method comprises, for example, the steps of: heating and applying a binder to at least the surface of a reinforcing fiber substrate on at least one side to prepare a reinforcing fiber substrate with binder; stacking multiple sheets of the reinforcing fiber substrate with binder to each other to obtain a stack comprising the binder at least between the sheets; and heating and then cooling the stack to allow the binder in the interlayer space to bond the substrates to each other and to stabilize the shape of the stack and to obtain a preform comprising the binder at least between the sheets in the stack.

Typically, a preform can be made by cutting a reinforcing fiber substrate with an applied binder into a predetermined shape, stacking multiple sheets of the reinforcing fiber substrate with binder in a mold, and applying appropriate heat and pressure to the reinforcing fiber substrate with binder. As a means of applying pressure, a press may be used, or a method may be used in which an object is enclosed in a vacuum bag film and the air in the vacuum bag is sucked by a vacuum pump to apply pressure to the object.

The content of reinforcing fibers in the fiber-reinforced composite material of the present invention is preferably not less than 45% by volume and not more than 70% by volume and more preferably not less than 50% by volume and not more than 65% by volume. In cases where the content of reinforcing fibers is not less than 45% by volume, a fiber-reinforced composite material with a higher elastic modulus and a high weight reduction effect is obtained. Moreover, in cases where the content of reinforcing fibers is not more than 70%, a fiber-reinforced composite material is obtained which does not lose strength due to friction between reinforcing fibers and has more excellent mechanical properties such as tensile strength.

In the present invention, a reinforcing fiber as a component of the reinforcing fiber substrate is not specifically limited, but examples of the reinforcing fiber include glass fibers, carbon fibers, graphite fibers, aramid fibers, boron fibers, alumina fibers, and silicon carbide fibers. Two or more of the reinforcing fibers can be combined for use. A carbon fiber or a graphite fiber, among others, is preferably used to obtain a fiber-reinforced composite material with lower weight and higher durability. Particularly in applications where high levels of weight reduction and strength increase are required, the reinforcing fiber as a component of a reinforcing fiber substrate in the fiber-reinforced composite material of the present invention is preferably a carbon fiber because carbon fiber has a high specific modulus and a high specific strength.

The carbon fiber used can be any type of carbon fiber, and the carbon fiber is preferably a carbon fiber having a tensile elastic modulus of not less than 230 GPa and not more than 400 GPa from the viewpoint of impact resistance. In addition, the carbon fiber preferably has a tensile strength of not less than 4.4 GPa and not more than 6.5 GPa from the viewpoint of strength because a composite material having high stiffness and mechanical strength can be obtained due to the tensile strength of the carbon fiber in the above range. Moreover, tensile elongation is also an important factor to consider, and the carbon fiber is preferably a high-strength, high-elongation, carbon fiber with an elongation of not less than 1.7% and not more than 2.3%. Accordingly, the most suitable carbon fiber is a carbon fiber with a tensile elastic modulus of at least 230 GPa, a tensile strength of at least 4.4 GPa, and a tensile elongation of at least 1.7%.

Commercial carbon fiber products include, for example, "TORAYCA®" T800G-24K, "TORAYCA®" T800S-24K, "TORAYCA®" T700G-24K, "TORAYCA®" T300-3K, and "TORAYCA®" T700S-12K (all manufactured by Toray Industries, Inc.).

The fiber-reinforced composite material of the present invention comprises a cured epoxy resin product of the epoxy resin composition of the present invention for fiber-reinforced composite material and a reinforcing fiber substrate, as described above. When a fiber-reinforced composite material is used, especially in the aircraft manufacturing field, the fiber-reinforced composite material is required to have high heat resistance and high mechanical properties. In the fiber-reinforced composite material of the present invention, the glass transition temperature of the cured epoxy resin, a matrix resin, is preferably 170° C. or higher and 190° C. or lower. The glass transition temperature of the cured epoxy resin in the above range contributes to the high heat resistance of the fiber-reinforced composite material of the present invention, and the high mechanical properties of the cured epoxy resin are reflected in the fiber-reinforced composite material. Thus, the H/W 0° compressive strength (the 0° compressive strength under wet and heat conditions) of the fiber-reinforced composite material of the present invention is high, and the fiber-reinforced composite material of the present invention can exhibit a high H/W 0° compressive strength, preferably an H/W 0° compressive strength of not less than 1000 MPa, and more preferably not less than 1100 MPa. In addition, the fiber-reinforced composite material of the present invention can exhibit a high compression-after-impact strength, preferably a compression-after-impact strength of not less than 260 MPa, and more preferably not less than 270 MPa.

The fiber-reinforced composite material of the present invention has high microcrack resistance. As used herein, the term "microcrack" refers to a tiny crack of tens of microns which can form in a fiber-reinforced composite material used in aircraft applications, and a fiber-reinforced composite material is known to be prone to microcracking when repeatedly exposed to an environment where the temperature changes repeatedly from a high temperature of up to 70° C. to a low temperature of down to −50° C. When the matrix resin in the fiber-reinforced composite material is exposed to an atmosphere where the temperature changes from a high temperature of up to 70° C. to a low temperature of down to −50° C., the matrix resin tries to shrink itself but fails because the matrix resin is surrounded by reinforcing fibers that shrink very little, resulting in tensile stress residing in the matrix resin (thermal residual stress). Repeated exposure to the temperature change can cause environmental fatigue to accumulate and microcracking to occur in the fiber-reinforced composite material. This phenomenon is particularly evident in the resin-rich part, and microcracking is also common in the resin-rich part. Under further environmental fatigue loading, if microcracks remain in the fiber-reinforced composite material, the microcracks will grow into larger crack, and the fiber-reinforced composite material may eventually lower the mechanical properties due to the presence of the large cracks. Due to the limitations of the RTM process, a channel for a resin is required during molding. Therefore, it is difficult to mold a fiber-reinforced composite material without a resin-rich part, and both increasing the fracture toughness of a cured matrix resin and maintaining a moderate modulus of elasticity to prevent an excessively high thermal residual stress to be generated in the matrix resin are effective in preventing microcracking due to environmental fatigue.

In the fiber-reinforced composite material of the present invention, the number of microcracks is preferably less than 10, more preferably not more than 5, from the viewpoint of the long-term durability of a fiber-reinforced composite material. A specific method of calculating the number of microcracks is described below.

A method of producing the fiber-reinforced composite material of the present invention comprises injecting an epoxy resin composition of the present invention for fiber-reinforced composite material heated to a temperature of 50° C. or higher and 130° C. or lower into a reinforcing fiber substrate placed in a mold heated to a temperature of 90° C. or higher and 180° C. or lower; impregnating the reinforcing fiber substrate with the epoxy resin composition; and curing the epoxy resin composition in the mold. The epoxy resin composition for fiber-reinforced composite material is heated to a temperature selected from the range of 50° C. to 130° C. before being injected into the reinforcing fiber substrate in terms of impregnation into a reinforcing fiber substrate, wherein the temperature is selected based on the initial viscosity and viscosity increase of the epoxy resin composition. In this respect, the high reactivity of the epoxy resin composition at the injection temperature results in increased viscosity during the injection process and difficult molding. Therefore, after the epoxy resin composition of the present invention for fiber-reinforced composite material is heated at 120° C. for 240 minutes, the resin viscosity preferably reaches not more than 200 mPa·s, more preferably not more than 180 mPa·s. In the present invention, viscosity is measured by the method described below. If the viscosity at 240 minutes after the start of injection exceeds the range described above, the impregnation of the epoxy resin composition may be inadequate. In addition, after heating at 120° C. for 240 minutes, the resin viscosity is preferably not less than 20 mPa·s, and the viscosity at the resin injection temperature is prevented from dropping too much, and unimpregnated areas can be prevented from forming due to the presence of pits created by entrained air during impregnation of a reinforcing fiber substrate. In addition, the molding temperature is preferably 90° C. or higher and 180° C. or lower. By setting the molding temperature at 90° C. or higher and 180° C. or lower, the curing time and the thermal shrinkage after demolding can be reduced simultaneously, and a fiber-reinforced composite material with high surface quality can be obtained.

The pressure used to inject the epoxy resin composition for fiber-reinforced composite material is typically not less than 0.1 MPa and not more than 1.0 MPa. The VaRTM (vacuum-assisted resin transfer molding) process can also be used, in which the thermosetting epoxy resin composition is injected into a mold under vacuum. The pressure used to inject the epoxy resin composition for fiber-reinforced composite material is preferably not less than 0.1 MPa and not more than 0.6 MPa from the viewpoint of injection time and equipment economy. In addition, even in cases of high-pressure injection, it is advantageous that a mold is vacuumed before injection of the epoxy resin composition for fiber-reinforced composite material to reduce the generation of voids.

The fiber-reinforced composite material of the present invention has high heat resistance, high compressive strength, impact resistance, and durability and therefore can be used for many structural materials, including aircraft parts, such as fuselage, main wing, tail wing, moving surface, fairing, cowl, door, seat, and interior material; spacecraft parts, such as motor case and main wing; satellite parts, such as body structure and antenna; automobile parts, such as outside plate, chassis, aerodynamic part, and seat; railway vehicle parts, such as body structure and seat; and watercraft parts, such as ship hull and seat.

EXAMPLES

The epoxy resin composition of the present invention for fiber-reinforced composite material and others will be described in more detail by the following examples, but the present invention is not limited to the examples.

<Resin Raw Material>

The following resin raw materials were used to obtain the epoxy resin compositions of Examples and Comparative Examples. It should be noted that the numerical value of each component listed in the Epoxy Resin Composition row of each table indicates the content of the component and that the unit of the content is parts by mass unless otherwise specified.

1. [A] Tetraglycidyl diaminodiphenylmethane
   "Araldite" MY721 (N,N,N',N'-tetraglycidyl-4,4'-diaminodiphenylmethane, epoxy equivalent weight: 113 g/mol, manufactured by Huntsman Japan K.K.)
2. [B] Bisphenol F-type epoxy resins
   "EPICLON®" 830 (bisphenol F diglycidyl ether, epoxy equivalent weight: 170 g/mol, manufactured by DIC Co.)
   "Araldite®" GY282 (bisphenol F diglycidyl ether, epoxy equivalent weight: 171 g/mol, manufactured by Huntsman Japan K.K.)
3. Epoxy resin other than the components [A] and [B]
   "EPICLON®" 850 (bisphenol A diglycidyl ether, epoxy equivalent weight: 188 g/mol, manufactured by DIC Co.)

4. [C] 4,4'-Methylenebis(3-chloro-2,6-diethylaniline)
   "Lonzacure®" M-CDEA (4,4'-methylenebis(3-chloro-2,6-diethylaniline, active hydrogen equivalent weight: 95 g/mol, manufactured by Lonza K.K.)
5. [D] 4,4'-Methylenebis(3,3',5,5'-tetraisopropylaniline)
   "Lonzacure®" M-DIPA (4,4'-methylenebis(3,3',5,5'-tetraisopropylaniline), active hydrogen equivalent weight: 93 g/mol, manufactured by Lonza K.K.)
6. [E] 4,4'-Methylenebis(2-isopropyl-6-methylaniline)
   "Lonzacure®" M-MIPA (3,3'-diisopropyl-5,5'-dimethyl-4,4'-diaminodiphenylmethane, active hydrogen equivalent weight: 78 g/mol, manufactured by Lonza K.K.)
7. Curing agents other than the components [C], [D], and [E]
   "Lonzacure®" M-DEA (3,3',5,5'-tetraethyl-4,4'-diaminodiphenylmethane, active hydrogen equivalent weight: 78 g/mol, manufactured by Lonza K.K.)
   "KAYAHARD®" A-A(PT) (a mixture comprising mainly 2,2'-diethyl-4,4'-diaminodiphenylmethane, active hydrogen equivalent weight: 64 g/mol, liquid, manufactured by Nippon Kayaku Co., Ltd.)
8. Additives
   "Kane Ace®" MX-416 (a masterbatch comprising 75% by mass of "Araldite®" MY721 and 25% by mass of core-shell rubber particles (volume average particle diameter: 100 nm, core part: crosslinked polybutadiene, shell part: methyl methacrylate-glycidyl methacrylate-styrene copolymer), manufactured by Kaneka Corporation)
   "Stafyroie®" AC-3355 (core-shell rubber particles (volume average particle diameter: 500 nm, core part: crosslinked poly(butyl acrylate), shell part: crosslinked polystyrene, manufactured by Aica Kogyo Co., Ltd.)

<Preparation of Epoxy Resin Composition>

The components were mixed together in the proportions shown in the tables to prepare epoxy resin compositions.

<Production of Cured Resin Plate>

Each of the epoxy resin compositions prepared as described above was defoamed under reduced pressure and then injected into a mold which had been adjusted with 2-mm thick "Teflon®" spacers to have a cavity depth of 2 mm. The epoxy resin compositions were cured at a temperature of 180° C. for 120 minutes to obtain cured resin plates with a thickness of 2 mm.

<Production of Binder>

Binders were produced according the following production methods.

(Production of Binder 1)

In a pressure vessel, 1.2 g of caprolactam, 18.8 g of laurolactam, and 10 g of ion-exchanged water were placed, and the pressure vessel was sealed and purged with nitrogen. The pressure vessel was then heated, and the steam was released to the outside when the internal pressure of the vessel reached 10 kg/cm$^2$ to maintain the internal pressure of the vessel at 10.0 kg/cm$^2$. After the internal temperature reached 170° C., the internal pressure of the vessel was reduced to normal pressure for 50 minutes, and the reaction was continued under nitrogen flow for 2 hours to complete polymerization. Subsequently, the resulting polymer, which was discharged from the pressure vessel in the gut form, was pelletized, and the polymer pellets were dried by suction drying (vacuum drying) at 80° C. for 24 hours to obtain PA-1 copolymer composed of Nylon 6 and Nylon 12 (=6%/94% by mass). Fibers of PA-1 (melting temperature: 170° C.) extruded from spinnerets with single orifice were extended by using an aspirator equipped with a baffle plate at the tip and compressed air, and then dispersed and collected on a metal mesh. The fiber sheets collected on the metal mesh were heat-bonded by using a hot-pressing machine to produce a nonwoven fabric form of binder 1.

(Production of Binder 2)

Fibers of PES ("SUMIKAEXCEL®" 5003P, melting temperature: N.A., manufactured by Sumitomo Chemical Co., Ltd.) extruded from spinnerets with single orifice were extended by using an aspirator equipped with a baffle plate at the tip and compressed air, and then dispersed and collected on a metal mesh. The fiber sheets collected on the metal mesh were heat-bonded by using a hot-pressing machine to produce a nonwoven form of binder 2.

(Production of Binder 3)

Fibers of PA-2 ("AMILAN®" CM1001, melting temperature: 225° C., manufactured by Toray Industries, Inc.) extruded from spinnerets with single orifice were extended by using an aspirator equipped with a baffle plate at the tip and compressed air, and then dispersed and collected on a metal mesh. The fiber sheets collected on the metal mesh were heat-bonded by using a hot-pressing machine to produce a nonwoven form of binder 3.

(Production of Binder 4)

Fibers of PA-3("Platamid®" M1657, melting temperature: 110° C., manufactured by Arkema S.A.) extruded from spinnerets with single orifice were extended by using an aspirator equipped with a baffle plate at the tip and compressed air, and then dispersed and collected on a metal mesh. The fiber sheets collected on the metal mesh were heat-bonded by using a hot-pressing machine to produce a nonwoven form of binder 4.

(Production of Binder 5)

By using a compact twin-screw kneader (S1KRC kneader, Kurimoto, Ltd.), 15 parts by mass of a cresol novolac-type epoxy resin ("EPICLON®" N-660, manufactured by DIC Co.), 25 parts by mass of a bisphenol-type epoxy resin ("jER®" 825, manufactured by Mitsubishi Chemical Co.), and 60 parts by mass of polyethersulfone ("SUMIKAEXCEL®" PES5200P, manufactured by Sumitomo Chemical Co., Ltd.) were mixed and kneaded under a temperature condition at 180° C. to prepare a binder resin composition. The prepared binder resin composition was frozen and ground in liquid nitrogen in a hammer mill (PULVERIZER, manufactured by Hosokawa Micron Co.) equipped with a 1-mm mesh screen to obtain a powdered binder 5. The particles were passed through a sieve with a mesh size of 150 μm and another sieve with a mesh size of 75 μm, and the binder particles remaining on the sieve with a mesh size of 75 μm were used for evaluation.

<Production of Reinforcing Fiber Substrate with Binder>

Each of the obtained binders was applied to one surface of a unidirectional carbon fiber fabric (plain weave, warp: carbon fiber T800S-24K-10C manufactured by Toray Industries, Inc., areal weight of carbon fibers: 295 g/m$^2$, warp density: 7.2 threads/25 mm, weft: glass fiber ECE225 1/0 1Z manufactured by Nitto Boseki Co., Ltd., weft density: 7.5 threads/25 mm). The amount of the binders 1 to 4 applied was 5 g/m$^2$, and the amount of the binder 5 applied was 10 g/m$^2$. Subsequently, the fabrics were heated and fused with a binder by using a far-infrared heater to obtain reinforcing fiber substrates with a binder on one surface.

<Evaluation>

The evaluation of each example was performed as described below. It should be noted that the number n of repetitions of the measurement is one (n=1), unless otherwise specified.

(1) Measurement of the Gelation Temperature of Epoxy Resin Compositions

A sample to be analyzed was placed on a heated stage at 70° C. in an ATD-1000 thermal curing analyzer (manufactured by Alpha Technologies), and the dynamic viscoelasticity of the sample was measured at a frequency of 1.0 Hz and a strain of 1% while the sample was heated at a temperature increase rate of 0.5° C./min to determine the complex viscosity. The temperature at which the complex viscosity reached $1.0\times10^5$ Pa·s was determined as the gelation temperature. Each epoxy resin composition obtained by combining all components and stirring the mixture for 1 minute was used as a sample.

(2) Measurement of the Viscosity of Epoxy Resin Compositions Held at 120° C. for 240 Minutes A sample to be analyzed was examined by using an E-type viscometer equipped with a standard cone rotor (1°34'×R24) in accordance with JIS Z8803 (1991) "Method for viscosity measurement by a cone-plate rotating viscometer" while held at 120° C. TVE-30H manufactured by Tokyo Keiki Inc. was used as the E-type viscometer. Each epoxy resin composition obtained by combining all components and stirring the mixture for 1 minute was used as a sample.

(3) Measurement of the Glass Transition Temperature Tg of Cured Epoxy Resins

A test specimen of 12.7 mm in width and 40 mm in length was cut from each cured resin plate, and an ARES DMA apparatus (manufactured by TA Instruments, Inc.) was used to perform Tg measurement on the test specimen. A temperature increase rate of 5° C./min was a measurement condition. The temperature at the inflection point of the resulting storage elastic modulus G' curve was determined as the Tg of the cured resin.

(4) Measurement of the 0° Compressive Strength Under Wet and Heat Conditions of Fiber-Reinforced Composite Materials The reinforcing fiber substrates with binder was cut into sheets having a size of 395 mm×395 mm, and four of the sheets were oriented in the direction of 0°, where the fiber orientation was defined as 0°, and stacked together, and the resulting stack was installed and clamped in a mold with a plate cavity of 400 mm×400 mm×1.2 mm. Then, the mold was heated to 120° C., and a resin injection machine was used to inject the epoxy resin composition previously heated to 120° C. into the mold at an injection pressure of 0.2 MPa. After the injection, the mold was heated from 120° C. to 180° C. at a rate of 0.5° C./min and held at 180° C. for 2 hours to cure the epoxy resin composition and then cooled down to 30° C. to obtain a fiber-reinforced composite material.

A test specimen of 12.7 mm in width and 79.4 mm in length was cut from each of the fiber-reinforced composite materials obtained by the above method so that the longitudinal axis of the test specimen was in the direction of 0°, to prepare a 0° compressive strength test specimen. The test specimen was immersed in hot water at 72° C. for 14 days to measure the 0° compressive strength of the fiber-reinforced composite material. The 0° compressive strength was measured using a universal testing machine (Instron 4208, manufactured by Instron Japan Co., Ltd.) in accordance with ASTM D695 at a crosshead speed of 1.27 mm/min and a measurement temperature of 82° C.

(5) Measurement of the Compression-After-Impact Strength of Fiber-Reinforced Composite Materials The reinforcing fiber substrate with binder was cut into sheets having a size of 395 mm×395 mm, and four of the sheets were stacked and oriented in the directions of 45°, 0°, −45°, and 90°, where the fiber orientation was defined as 0°, and the stack was tripled to laminate 12 sheets, and another four of the sheets were stacked and oriented in the directions of 90°, −45°, 0°, and 45°, and the stack was tripled to laminate 12 sheets. The latter laminate was placed on the former laminate, and the resulting stack was installed and clamped in a mold with a plate cavity of 400 mm×400 mm×4.8 mm. Then, the mold was heated to 120° C., and a resin injection machine was used to inject the epoxy resin composition previously heated to 120° C. into the mold at an injection pressure of 0.2 MPa. After the injection, the mold was heated from 120° C. to 180° C. at a rate of 0.5° C./min and held at 180° C. for 2 hours to cure the epoxy resin composition and then cooled down to 30° C. to obtain a fiber-reinforced composite material.

A test specimen of 101.6 mm in width and 152.4 mm in length was cut from each of the fiber-reinforced composite materials obtained by the above method so that the longitudinal axis of the test specimen was in the direction of 0°, to measure the compression-after-impact strength in accordance with SACMA SRM 2R-94. A universal testing machine (Tensilon 1128, manufactured by Instron Japan Co., Ltd.) was used for the testing. For this test, the drop impact energy was set at 6.7 J/mm, and the crosshead speed was set at 1.27 mm/min.

(6) Number of Microcracks in Fiber-Reinforced Composite Materials

A test specimen of 75 mm in width and 50 mm in length was cut from each of the fiber-reinforced composite materials obtained by the above method (5) so that the longitudinal axis of the test specimen was in the direction of 0°. The obtained test specimen was exposed to the environmental conditions described in procedures a, b, and c below using a commercial constant temperature/humidity chamber and a commercial environmental testing machine.

a. Using a commercial constant temperature/humidity chamber, each test specimen was exposed to an environment of 49° C. and 95%/RH for 12 hours.
b. After the exposure, each test specimen was transferred to a commercial environmental testing machine and exposed to an environment at −54° C. for 1 hour. Then, the temperature was increased to 71° C. at a temperature increase rate of 10° C.±2° C./min. After the temperature increase was completed, the temperature was held at 71° C. for 5±1 minutes and then decreased to −54° C. at a rate of 10° C.±2° C./min and held at −54° C. for 5±1 minutes. The cycle consisting of the temperature increase from −54° C. to 71° C. and the temperature decrease to −54° C. was defined as one cycle, and this cycle was repeated 200 times.
c. The environmental exposure using the above-described constant temperature/humidity chamber and the cycles using the environmental testing machine were defined together as one block, and this block was repeated 5 times.

A sample of 25 mm in length was cut from an area extending 10 mm in both directions from the longitudinal centerline of each test specimen exposed to the environment described above, and the surface of the sample was polished to prepare an observation surface. The observation surface of the cut piece was observed under a commercial microscope at 200× magnification to count the number of cracks. The number of microcracks observed by the above method is preferably less than 10, more preferably not more than 5, from the viewpoint of the long-term durability of a fiber-reinforced composite material. Therefore, the number of not more than 5 was rated A, and the number of not less than 6 but less than 10 was rated B, and the number of not less than 10 was rated C.

Example 1

An epoxy resin composition was prepared by combining 70 parts by mass of "Araldite" MY721 as the component [A], 30 parts by mass of "EPICLON®" 830 as the component [B], 59 parts by mass of "Lonzacure®" M-CDEA as the component [C], and parts by mass of "Lonzacure®" M-DIPA as the component [D], as shown in Table 1-1, and stirring the resulting mixture at 80° C. for 1 hour. The gelation temperature of the epoxy resin composition was measured as described above, and the result was 177° C. The interfacial adhesion between a binder and a resin was high and the shape of the binder was retained at this temperature, indicating that the gelation temperature is a particularly preferable temperature capable of ensuring a consistent interlayer thickness that allows sufficient plastic deformation in a fiber-reinforced composite material. Next, the viscosity of the epoxy resin composition held at 120° C. for 240 minutes was measured, and the result was 140 mPa·s, specifically indicating excellent impregnation into reinforcing fibers. In addition, a cured resin was prepared by the above method to measure the Tg of the cured product, and the result was 175° C., specifically indicating excellent heat resistance. Furthermore, the epoxy resin composition was used to produce a fiber-reinforced composite material, and the 0° compressive strength under wet and heat conditions, compression-after-impact strength, and number of microcracks of the fiber-reinforced composite material were measured. The results showed that the fiber-reinforced composite material had a 0° compressive strength under wet and heat conditions of 1060 MPa, which was rated as good, a compression-after-impact strength of 280 MPa, which was rated as excellent, and a number of microcracks of not more than 5, which was rated as excellent.

Examples 2 to 5

Epoxy resin compositions were prepared in the same manner as in Example 1, except that the contents of all components were changed as shown in Table 1-1. The gelation temperatures of the epoxy resin compositions were measured as described above, and all of the results were 170° C. or higher and 185° C. or lower. The interfacial adhesion between a binder and a resin was high and the shape of the binder was retained at a temperature in the above range, indicating that the gelation temperatures are particularly preferable temperatures capable of ensuring a consistent interlayer thickness that allows sufficient plastic deformation in a fiber-reinforced composite material. The gelation temperatures of Examples 2, 3, and 5, among others, were 175° C. or higher and 185° C. or lower, which are particularly preferable results. Next, the viscosities of the epoxy resin compositions held at 120° C. for 240 minutes were measured, and all of the results were not more than 200 mPa·s, indicating good impregnation property into reinforcing fibers. The viscosities of Examples 2, 3, and 5, among others, were not more than 180 mPa·s, which are particularly preferable results. In addition, cured resins were prepared by the above method to measure the Tg of the cured products, and all of the results were 175° C. or higher, specifically indicating excellent heat resistance. Furthermore, the epoxy resin compositions were used to produce fiber-reinforced composite materials, and the 0° compressive strength under wet and heat conditions, compression-after-impact strength, and number of microcracks of the fiber-reinforced composite materials were measured. The results showed that all the fiber-reinforced composite materials had a 0° compressive strength under wet and heat conditions of not less than 1000 MPa, a compression-after-impact strength of not less than 260 MPa, and a number of microcracks of less than 10, indicating high mechanical properties and excellent durability. Examples 2, 3, and 5, among others, had a 0° compressive strength under wet and heat conditions of not less than 1100 MPa, a compression-after-impact strength of not less than 270 MPa, and a number of microcracks of not more than 5, which are particularly preferable results.

Example 6

An epoxy resin composition was prepared by combining 80 parts by mass of "Araldite®" MY721 as the component [A], 20 parts by mass of "EPICLON®" 830 as the component [B], 52 parts by mass of "Lonzacure®" M-CDEA as the component [C], 17 parts by mass of "Lonzacure®" M-DIPA as the component [D], and 15 parts by mass of "Lonzacure®" M-MIPA as the component [E], as shown in Table 1-1, and stirring the resulting mixture at 80° C. for 1 hour. The gelation temperature of the epoxy resin composition was measured as described above, and the result was 170° C. The interfacial adhesion between a binder and a resin was high and the shape of the binder was retained at this temperature, indicating that the gelation temperature is a temperature capable of ensuring a consistent interlayer thickness that allows sufficient plastic deformation in a fiber-reinforced composite material. Next, the viscosity of the epoxy resin composition held at 120° C. for 240 minutes was measured, and the result was 200 mPa·s, indicating excellent impregnation into reinforcing fibers. In addition, a cured resin was prepared by the above method to measure the Tg of the cured product, and the result was 186° C., specifically indicating excellent heat resistance. Furthermore, the epoxy resin composition was used to produce a fiber-reinforced composite material, and the 0° compressive strength under wet and heat conditions, compression-after-impact strength, and number of microcracks of the fiber-reinforced composite material were measured. The results showed that the fiber-reinforced composite material had a 0° compressive strength under wet and heat conditions of 1030 MPa, which was rated as good, a compression-after-impact strength of 260 MPa, which was rated as good, and a number of microcracks of not less than 6 and less than 10, which was rated as good.

Examples 7 and 8

Epoxy resin compositions were prepared in the same manner as in Example 6, except that the contents of all components were changed as shown in Tables 1-1 and 1-2. The gelation temperatures of the epoxy resin compositions were measured as described above, and all of the results were 175° C. or higher and 185° C. or lower. The interfacial adhesion between a binder and a resin was high and the shape of the binder was retained at a temperature in the above range, indicating that the gelation temperatures are particularly preferable temperatures capable of ensuring a consistent interlayer thickness that allows sufficient plastic deformation in a fiber-reinforced composite material. Next, the viscosities of the epoxy resin compositions held at 120° C. for 240 minutes were measured, and all of the results were not more than 180 mPa s, specifically indicating excellent impregnation into reinforcing fibers. In addition, cured resins were prepared by the above method to measure the Tg of the cured products, and all of the results were 175° C. or higher, specifically indicating excellent heat resistance. Furthermore, the epoxy resin compositions were used to produce fiber-reinforced composite materials, and the 0° compressive strength under wet and heat conditions, compression-after-impact strength, and number of microcracks of the fiber-reinforced composite materials were measured. The results showed that all the fiber-reinforced composite materials had a 0° compressive strength under wet and heat conditions of not less than 1100 MPa, a compression-after-impact strength of not less than 270 MPa, and a number of microcracks of not more than 5, specifically indicating high mechanical properties and excellent durability.

Example 9

An epoxy resin composition was prepared in the same manner as in Example 7, except that "Araldite®" GY282 was used as the component [B]. The gelation temperature of the epoxy resin composition was measured as described above, and the result was 175° C. The interfacial adhesion between a binder and a resin was high and the shape of the binder was retained at this temperature, indicating that the gelation temperature is a particularly preferable temperature capable of ensuring a consistent interlayer thickness that allows sufficient plastic deformation in a fiber-reinforced composite material. Next, the viscosity of the epoxy resin composition held at 120° C. for 240 minutes was measured, and the result was 170 mPa s, specifically indicating excellent impregnation into reinforcing fibers. In addition, a cured resin was prepared by the above method to measure the Tg of the cured product, and the result was 184° C., indicating excellent heat resistance. Furthermore, the epoxy resin composition was used to produce a fiber-reinforced composite material, and the 0° compressive strength under wet and heat conditions, compression-after-impact strength, and number of microcracks of the fiber-reinforced composite material were measured. The results showed that the fiber-reinforced composite material had a 0° compressive strength under wet and heat conditions of 1150 MPa, which was rated as good, a compression-after-impact strength of 270 MPa, which was rated as excellent, and a number of microcracks of not more than 5, which was rated as excellent.

Example 10

An epoxy resin composition was prepared in the same manner as in Example 7, except that "Lonzacure®" M-DEA was used instead of the component [E]. The gelation temperature of the epoxy resin composition was measured as described above, and the result was 176° C. The interfacial adhesion between a binder and a resin was good and the shape of the binder was retained at this temperature, indicating that the gelation temperature is a particularly preferable temperature capable of ensuring a consistent interlayer thickness that allows sufficient plastic deformation in a fiber-reinforced composite material. Next, the viscosity of the epoxy resin composition held at 120° C. for 240 minutes was measured, and the result was 160 mPa·s, specifically indicating excellent impregnation into reinforcing fibers. In addition, a cured resin was prepared by the above method to measure the Tg of the cured product, and the result was 174° C., indicating excellent heat resistance. Furthermore, the epoxy resin composition was used to produce a fiber-reinforced composite material, and the 0° compressive strength under wet and heat conditions, compression-after-impact strength, and number of microcracks of the fiber-reinforced composite material were measured. The results showed that the fiber-reinforced composite material had a 0° compressive strength under wet and heat conditions of 1040 MPa, which was rated as good, a compression-after-impact strength of 270 MPa, which was rated as excellent, and a number of microcracks of not more than 5, which was rated as excellent.

Examples 11 to 13

Epoxy resin compositions were prepared in the same manner as in Example 2, except that the contents of all components and the H/E ratio were changed as shown in Table 1-2. The gelation temperatures of the epoxy resin compositions were measured as described above, and all of the results were 170° C. or higher and 185° C. or lower. The interfacial adhesion between a binder and a resin was good and the shape of the binder was retained at a temperature in the above range, indicating that the gelation temperatures are particularly preferable temperatures capable of ensuring a consistent interlayer thickness that allows sufficient plastic deformation in a fiber-reinforced composite material. The gelation temperatures of Examples 11 and 12, among others, were 175° C. or higher and 185° C. or lower, which are particularly preferable results. Next, the viscosities of the epoxy resin compositions held at 120° C. for 240 minutes were measured, and all of the results were not more than 200 mPa·s, indicating good impregnation property into reinforcing fibers. The viscosities of Examples 11 and 12, among others, were not more than 180 mPa·s, which are particularly preferable results. In addition, cured resins were prepared by the above method to measure the Tg of the cured products, and all of the results were 170° C. or higher, indicating good heat resistance. The glass transition temperatures of Examples 11 and 12, among others, were 175° C. or higher, which are particularly preferable results. Furthermore, the epoxy resin compositions were used to produce fiber-reinforced composite materials, and the 0° compressive strength under wet and heat conditions, compression-after-impact strength, and number of microcracks of the fiber-reinforced composite materials were measured. The results showed that all the fiber-reinforced composite materials had a 0° compressive strength under wet and heat conditions of not less than 1000 MPa, a compression-after-impact strength of not less than 260 MPa, and a number of microcracks of less than 10, indicating high mechanical properties and good durability. Among those examples, Example 11 had a number of microcracks of not more than 5, and Example 12 had a 0° compressive strength under wet and heat conditions of not less than 1100 MPa, a compression-after-impact strength of not less than 270 MPa, and a number of microcracks of not more than 5, which are particularly preferable results.

Examples 14 to 16

Epoxy resin compositions were prepared in the same manner as in Example 7, except that the contents of all components and the H/E ratio were changed as shown in Tables 1-2 and 1-3. The gelation temperatures of the epoxy resin compositions were measured as described above, and all of the results were 170° C. or higher and 185° C. or lower. The interfacial adhesion between a binder and a resin was good and the shape of the binder was retained at a temperature in the above range, indicating that the gelation temperatures are particularly preferable temperatures capable of ensuring a consistent interlayer thickness that allows sufficient plastic deformation in a fiber-reinforced composite material. The gelation temperatures of Examples 14 and 15, among others, were 175° C. or higher and 185° C. or lower, which are particularly preferable results. Next, the viscosities of the epoxy resin compositions held at 120° C. for 240 minutes were measured, and all of the results were not more than 200 mPa·s, indicating good impregnation property into reinforcing fibers. The viscosities of Examples 14 and 15, among others, were not more than 180 mPa·s, which are particularly preferable results. In addition, cured resins were prepared by the above method to measure the Tg of the cured products, and all of the results were 170° C. or higher, indicating excellent heat resistance. The glass transition temperatures of Examples 14 and 15, among others, were 175° C. or higher, which are particularly preferable results. Furthermore, the epoxy resin compositions were used to produce fiber-reinforced composite materials, and the 0° compressive strength under wet and heat conditions, compression-after-impact strength, and number of microcracks of the fiber-reinforced composite materials were measured. The results showed that all the fiber-reinforced composite materials had a 0° compressive strength under wet and heat conditions of not less than 1000 MPa, a compression-after-impact strength of not less than 260 MPa, and a number of microcracks of less than 10, indicating high mechanical properties and excellent durability. Among those examples, Example 14 had a number of microcracks of not more than 5, and Example 15 had a 0° compressive strength under wet and heat conditions of 1140 MPa, a compression-after-impact strength of 275 MPa, and a number of microcracks of not more than 5, which are particularly preferable results.

Example 17

A epoxy resin composition was prepared by combining 65 parts by mass of "Araldite®" MY721 as the component [A], 20 parts by mass of "EPICLON®" 830 as the component [B], 61 parts by mass of "Lonzacure®" M-CDEA as the component [C], 26 parts by mass of "Lonzacure®" M-DIPA as the component [D], and 20 parts by mass of "Kane Ace®" MX-416 as the component [F], as shown in Table 1-3, and stirring the resulting mixture at 80° C. for 1 hour. The gelation temperature of the epoxy resin composition was measured as described above, and the result was 177° C. The interfacial adhesion between a binder and a resin was high and the shape of the binder was retained at this temperature, indicating that the gelation temperature is a particularly preferable temperature capable of ensuring a consistent interlayer thickness that allows sufficient plastic deformation in a fiber-reinforced composite material. Next, the viscosity of the epoxy resin composition held at 120° C. for 240 minutes was measured, and the result was 170 mPa·s, specifically indicating good impregnation property into reinforcing fibers. In addition, a cured resin was prepared by the above method to measure the Tg of the cured product, and the result was 182° C., specifically indicating good heat resistance. Furthermore, the epoxy resin composition was used to produce a fiber-reinforced composite material, and the 0° compressive strength under wet and heat conditions, compression-after-impact strength, and number of microcracks of the fiber-reinforced composite material were measured. The results showed that the fiber-reinforced composite material had a 0° compressive strength under wet and heat conditions of 1100 MPa, a compression-after-impact strength of 280 MPa, and a number of microcracks of not more than 5, specifically indicating high mechanical properties and good durability.

Examples 18 and 19

Epoxy resin compositions were prepared in the same manner as in Example 17, except that the contents of all components and the type of core-shell rubber particles were changed as shown in Table 1-3. The gelation temperatures of the epoxy resin compositions were measured as described above, and all of the results were 175° C. or higher and 185° C. or lower. The interfacial adhesion between a binder and a resin was good and the shape of the binder was retained at a temperature in the above range, indicating that the gelation temperatures are particularly preferable temperatures capable of ensuring a consistent interlayer thickness that allows sufficient plastic deformation in a fiber-reinforced composite material. Next, the viscosities of the epoxy resin compositions held at 120° C. for 240 minutes were measured, and all of the results were not more than 200 mPa s, indicating good impregnation property into reinforcing fibers. The viscosity of Example 19, among others, was 170 mPa s, which is a particularly preferable result. In addition, cured resins were prepared by the above method to measure the Tg of the cured products, and all of the results were 175° C. or higher, specifically indicating good heat resistance. Furthermore, the epoxy resin compositions were used to produce fiber-reinforced composite materials, and the 0° compressive strength under wet and heat conditions, compression-after-impact strength, and number of microcracks of the fiber-reinforced composite materials were measured. The results showed that all the fiber-reinforced composite materials had a 0° compressive strength under wet and heat conditions of not less than 1000 MPa and a compression-after-impact strength of not less than 260 MPa, indicating good mechanical properties, and a number of microcracks of not more than 5, specifically indicating good durability. Among those examples, Example 18 had a compression-after-impact strength of 280 MPa, which is a particularly preferable result.

Example 20

An epoxy resin composition was prepared by combining 65 parts by mass of "Araldite®" MY721 as the component [A], 20 parts by mass of "EPICLON®" 830 as the component [B], 78 parts by mass of "Lonzacure®" M-CDEA as the component [C], 5 parts by mass of "Lonzacure®" M-DIPA as the component [D], 4 parts by mass of "Lonzacure®" M-MIPA as the component [E], and 20 parts by mass of "Kane Ace®" MX-416 as the component [F], as shown in Table 1-3, and stirring the resulting mixture at 80° C. for 1 hour. The gelation temperature of the epoxy resin composition was measured as described above, and the result was 184° C. The interfacial adhesion between a binder and a resin was good and the shape of the binder was retained at this temperature, indicating that the gelation temperature is a particularly preferable temperature capable of ensuring a consistent interlayer thickness that allows sufficient plastic deformation in a fiber-reinforced composite material. Next, the viscosity of the epoxy resin composition held at 120° C. for 240 minutes was measured, and the result was 120 mPa·s, specifically indicating good impregnation property into reinforcing fibers. In addition, a cured resin was prepared by the above method to measure the Tg of the cured product, and the result was 180° C., specifically indicating good heat resistance. Furthermore, the epoxy resin composition was used to produce a fiber-reinforced composite material, and the 0° compressive strength under wet and heat conditions, compression-after-impact strength, and number of microcracks of the fiber-reinforced composite material were measured. The results showed that the fiber-reinforced composite material had a 0° compressive strength under wet and heat conditions of 1120 MPa, a compression-after-impact strength of 280 MPa, and a number of microcracks of not more than 5, specifically indicating good mechanical properties and good durability.

Examples 21 and 22

Epoxy resin compositions were prepared in the same manner as in Example 20, except that the contents of all components and the type of core-shell rubber particles were changed as shown in Table 1-4. The gelation temperatures of the epoxy resin compositions were measured as described above, and all of the results were 175° C. or higher and 185° C. or lower. The interfacial adhesion between a binder and a resin was good and the shape of the binder was retained at a temperature in the above range, indicating that the gelation temperatures are particularly preferable temperatures capable of ensuring a consistent interlayer thickness that allows sufficient plastic deformation in a fiber-reinforced composite material. Next, the viscosities of the epoxy resin compositions held at 120° C. for 240 minutes were measured, and all of the results were not more than 180 mPa·s, specifically indicating good impregnation property into reinforcing fibers. In addition, cured resins were prepared by the above method to measure the Tg of the cured products, and all of the results were 175° C. or higher, specifically indicating good heat resistance. Furthermore, the epoxy resin compositions were used to produce fiber-reinforced composite materials, and the 0° compressive strength under wet and heat conditions, compression-after-impact strength, and number of microcracks of the fiber-reinforced composite materials were measured. The results showed that all the fiber-reinforced composite materials had a 0° compressive strength under wet and heat conditions of not less than 1000 MPa and compression-after-impact strength of not less than 260 MPa, indicating good mechanical properties, and a number of microcracks of not more than 5, specifically indicating good durability. Among those examples, Example 21 had a 0° compressive strength under wet and heat conditions of 1140 MPa and a compression-after-impact strength of 275 MPa, which are particularly preferable results.

Examples 23 to 26

Epoxy resin compositions were prepared in the same manner as in Example 2, except that the type of a binder was changed. The gelation temperatures of the epoxy resin compositions were measured as described above, and all of the results were 175° C. or higher and 185° C. or lower. The interfacial adhesion between a binder and a resin was good and the shape of each binder was retained at a temperature in the above range when the melting temperature of a binder was 165° C. or higher and 180° C. or lower, indicating that the gelation temperatures are particularly preferable temperatures capable of ensuring a consistent interlayer thickness that allows sufficient plastic deformation in a fiber-reinforced composite material. Next, the viscosities of the epoxy resin compositions held at 120° C. for 240 minutes were measured, and all of the results were not more than 180 mPa s, specifically indicating good impregnation property into reinforcing fibers. In addition, cured resins were prepared by the above method to measure the Tg of the cured products, and all of the results were 175° C. or higher, specifically indicating excellent heat resistance. Furthermore, the epoxy resin compositions were used to produce fiber-reinforced composite materials, and the 0° compressive strength under wet and heat conditions, compression-after-impact strength, and number of microcracks of the fiber-reinforced composite materials were measured. The results showed that all the fiber-reinforced composite materials had a 0° compressive strength under wet and heat conditions of not less than 1000 MPa, a compression-after-impact strength of not less than 260 MPa, and a number of microcracks of less than 10, indicating good mechanical properties and good durability. Among those examples, Example 21 had a number of microcracks of not more than 5, and Example 25 had a 0° compressive strength under wet and heat conditions of 1100 MPa, and a number of microcracks of not more than 5, and Example 26 had a number of microcracks of not more than 5, which are particularly preferable results.

Comparative Examples 1 and 2

Epoxy resin compositions were prepared in the same manner as in Example 1, except that the contents of all components were changed as shown in Table 2-1. The gelation temperatures of the epoxy resin compositions were measured as described above, and all of the results were 175° C. or higher and 185° C. or lower. The interfacial adhesion between a binder and a resin was good and the shape of the binder was retained at a temperature in the above range, indicating that the gelation temperatures are particularly preferable temperatures capable of ensuring a consistent interlayer thickness that allows sufficient plastic deformation in a fiber-reinforced composite material. Next, the viscosities of the epoxy resin compositions held at 120° C. for 240 minutes were measured, and the results showed that Comparative Example 1 had a viscosity of 100 mPa s, which specifically indicates good impregnation property into reinforcing fibers, and that Comparative Example 2 had a viscosity of 210 mPa s, which is a viscosity of more than 200 mPa s and indicates poor impregnation property into reinforcing fibers. In addition, cured resins were prepared by the above method to measure the Tg of the cured products, and the results showed that Comparative Example 1 has a Tg of 168° C., which is lower than 170° C. and indicates poor heat resistance, and that Comparative Example 2 has a Tg of 196° C., which specifically indicates good heat resistance. Furthermore, the epoxy resin compositions were used to produce fiber-reinforced composite materials, and the 0° compressive strength under wet and heat conditions, compression-after-impact strength, and number of microcracks of the fiber-reinforced composite materials were measured. Comparative Example 1 had a 0° compressive strength under wet and heat conditions of 990 MPa, which is less than 1000 MPa and indicates poor 0° compressive strength under wet and heat conditions, and Comparative Example 2 had a 0° compressive strength under wet and heat conditions of 1270 MPa, which is a particularly preferable result. Next, Comparative Example 1 had a compression-after-impact strength of 285 MPa, which is a particularly preferable result, and Comparative Example 2 had a compression-after-impact strength of 245 MPa, which is less than 260 MPa and indicates poor impact resistance. Furthermore, both Comparative Examples 1 and 2 had a number of microcracks of not more than 5, specifically indicating good durability.

Comparative Example 3

An epoxy resin composition was prepared in the same manner as in Example 2, except that "EPICLON®" 850 was used instead of the component [B] and the proportions of all components were changed. The gelation temperature of the epoxy resin composition was measured as described above, and the result was 177° C. The interfacial adhesion between a binder and a resin was good and the shape of the binder was retained at this temperature, indicating that the gelation temperature is a particularly preferable temperature capable of ensuring a consistent interlayer thickness that allows sufficient plastic deformation in a fiber-reinforced composite material. Next, the viscosity of the epoxy resin composition held at 120° C. for 240 minutes was measured, and the result was 180 mPa·s, specifically indicating good impregnation property into reinforcing fibers. In addition, a cured resin was prepared by the above method to measure the Tg of the cured product, and the result was 187° C., specifically indicating good heat resistance. Furthermore, the epoxy resin composition was used to produce a fiber-reinforced composite material, and the 0° compressive strength under wet and heat conditions, compression-after-impact strength, and number of microcracks of the fiber-reinforced composite material were measured. The results showed that the fiber-reinforced composite material had a 0° compressive strength under wet and heat conditions of 980 MPa, which is less than 1000 MPa and indicates poor 0° compressive strength under wet and heat conditions, a compression-after-impact strength of 275 MPa, which specifically indicates good impact resistance, and a number of microcracks of not more than 5, which specifically indicates good durability.

Comparative Example 4

An epoxy resin composition was prepared in the same manner as in Example 2, except that only the component [C] was used as the curing agent and the proportions of all components were changed. The gelation temperature of the epoxy resin composition was measured as described above, and the result was 195° C. The binder was excessively fused to the resin and the shape of the binder was not retained at this temperature, indicating that the gelation temperature is a temperature that is not capable of ensuring a consistent interlayer thickness that allows sufficient plastic deformation in a fiber-reinforced composite material. Next, the viscosity of the epoxy resin composition held at 120° C. for 240 minutes was measured, and the result was 90 mPa·s, specifically indicating good impregnation property into reinforcing fibers. In addition, a cured resin was prepared by the above method to measure the Tg of the cured product, and the result was 178° C., specifically indicating good heat resistance. Furthermore, the epoxy resin composition was used to produce a fiber-reinforced composite material, and the 0° compressive strength under wet and heat conditions, compression-after-impact strength, and number of microcracks of the fiber-reinforced composite material were measured. The results showed that the fiber-reinforced composite material had a 0° compressive strength under wet and heat conditions of 1100 MPa, which is a particularly preferable result, a compression-after-impact strength of 255 MPa, which is less than 260 MPa and indicates poor impact resistance, and a number of microcracks of not more than 5, which specifically indicates good durability.

Comparative Examples 5 to 8

Epoxy resin compositions were prepared in the same manner as in Comparative Example 4, except that only one of the component [D], the component [E], or a single curing agent other than the components [C], [D], and [E] was used as the curing agent and the proportions of all components were changed. The gelation temperatures of the epoxy resin compositions were measured as described above, and all of the results were lower than 170° C. The binder used to bind a reinforcing fiber substrate began to melt at a temperature higher than the gelation temperatures of the epoxy resin compositions, indicating that the gelation temperatures are temperatures that reduce the interfacial adhesion strength. Next, the viscosities of the epoxy resin compositions held at 120° C. for 240 minutes were measured, and all of the results were more than 1000 mPa·s, which is more than 200 mPa·s and indicates poor impregnation into reinforcing fibers. In addition, cured resins were prepared by the above method to measure the Tg of the cured products, and the results were 170° C. or higher, indicating good heat resistance. The glass transition temperatures of Comparative Examples 5, 6, and 7, among others, were 175° C. or higher, which are particularly preferable results. Furthermore, the epoxy resin compositions were used to produce fiber-reinforced composite materials, and the 0° compressive strength under wet and heat conditions, compression-after-impact strength, and number of microcracks of the fiber-reinforced composite materials were measured. The results showed that all the fiber-reinforced composite materials had a 0° compressive strength under wet and heat conditions of less than 1000 MPa, a compression-after-impact strength of less than 260 MPa, and a number of microcracks of not less than 10, indicating low mechanical properties and poor durability.

Comparative Examples 9 to 11

Epoxy resin compositions were prepared in the same manner as in Example 2, except that the component [E] or a single curing agent other than the components [C], [D], and [E] was used instead of the component [D] and the proportions of all components were changed. The gelation temperatures of the epoxy resin compositions were measured as described above, and all of the results were lower than 170° C. The binder used to bind a reinforcing fiber substrate began to melt at a temperature higher than the gelation temperatures of the epoxy resin compositions, indicating that the gelation temperatures are temperatures that reduce the interfacial adhesion strength. Next, the viscosities of the epoxy resin compositions held at 120° C. for 240 minutes were measured, and all of the results were more than 200 mPa·s, indicating poor impregnation into reinforcing fibers. In addition, cured resins were prepared by the above method to measure the Tg of the cured products, and the results were 175° C. or higher, indicating particularly good heat resistance. Furthermore, the epoxy resin compositions were used to produce fiber-reinforced composite materials, and the 0° compressive strength under wet and heat conditions, compression-after-impact strength, and number of microcracks of the fiber-reinforced composite materials were measured. The results showed that all the fiber-reinforced composite materials had a 0° compressive strength under wet and heat conditions of less than 1000 MPa, a compression-after-impact strength of less than 260

MPa, and a number of microcracks of not less than 10, indicating low mechanical properties and poor durability.

Comparative Examples 12 and 13

Epoxy resin compositions were prepared in the same manner as in Example 7, except that a single curing agent other than the components [C], [D], and [E] was used instead of the component [D] and the proportions of all components were changed. The gelation temperatures of the epoxy resin compositions were measured as described above, and all of the results were lower than 170° C. The binder used to bind a reinforcing fiber substrate began to melt at a temperature higher than the gelation temperatures of the epoxy resin compositions, indicating that the gelation temperatures are temperatures that reduce the interfacial adhesion strength. Next, the viscosities of the epoxy resin compositions held at 120° C. for 240 minutes were measured, and all of the results were more than 200 mPa·s, indicating poor impregnation property into reinforcing fibers. In addition, cured resins were prepared by the above method to measure the Tg of the cured products, and the results were 175° C. or higher, indicating particularly good heat resistance. Furthermore, the epoxy resin compositions were used to produce fiber-reinforced composite materials, and the 0° compressive strength under wet and heat conditions, compression-after-impact strength, and number of microcracks of the fiber-reinforced composite materials were measured. The results showed that all the fiber-reinforced composite materials had a 0° compressive strength under wet and heat conditions of less than 1000 MPa, a compression-after-impact strength of less than 260 MPa, and a number of microcracks of not less than 10, indicating low mechanical properties and poor durability.

TABLE 1-1

| | | | | Ex. 1 | Ex. 2 | Ex. 3 | Ex. 4 | Ex. 5 | Ex. 6 | Ex. 7 |
|---|---|---|---|---|---|---|---|---|---|---|
| Epoxy Resin Composition | Epoxy resin | [A] Tetraglycidyl diamino diphenylmethane | "Araldite ®" MY721 | 70 | 80 | 90 | 80 | 80 | 80 | 80 |
| | | [B] Bisphenol F-type epoxy resin | "EPICLON ®" 830 | 30 | 20 | 10 | 20 | 20 | 20 | 20 |
| | | | "Araldite ®" GY282 | 0 | 0 | 0 | 0 | 0 | 0 | 0 |
| | | Epoxy resin other than [A] and [B] | "EPICLON ®" 850 | 0 | 0 | 0 | 0 | 0 | 0 | 0 |
| | Curing agent | [C] 4,4'-Methylenebis (3-chloro-2, 6-diethylaniline) | "Lonzacure ®" M-CDEA | 59 | 61 | 63 | 52 | 78 | 52 | 61 |
| | | [D] 4,4'-Methylenebis (3,3',5,5'-tetraisopropylaniline) | "Lonzacure ®" M-DIPA | 25 | 26 | 27 | 34 | 9 | 17 | 13 |
| | | [E] 4,4'-methylenebis (2-isopropyl-6-methylaniline) | "Lonzacure ®" M-MIPA | 0 | 0 | 0 | 0 | 0 | 15 | 11 |
| | | Curing agent other than [C], [D], and [E] | "Lonzacure ®" M-DEA | 0 | 0 | 0 | 0 | 0 | 0 | 0 |
| | | | "KAYAHARD ®" A-A(PT) | 0 | 0 | 0 | 0 | 0 | 0 | 0 |
| | Additive | [F] Core-shell rubber particles having a volume average particle diameter of not less than 50 nm and not more than 300 nm and having epoxy groups in the shell | "Kane Ace ®" MX-416 volume average particle diameter: 100 nm [content of core-shell rubber particles] | 0 [0] | 0 [0] | 0 [0] | 0 [0] | 0 [0] | 0 [0] | 0 [0] |
| | | Core-shell rubber particles other than [F] | "Stafyroid ®" AC-3355 volume average particle diameter: 500 nm | 0 | 0 | 0 | 0 | 0 | 0 | 0 |
| | Content of [C] (% by mass) in the total of curing agents taken as 100% by mass | | | 70 | 70 | 70 | 60 | 90 | 62 | 72 |
| | H/E | | | 1.1 | 1.1 | 1.1 | 1.1 | 1.1 | 1.1 | 1.1 |
| | Properties of uncured resin | Gelation temperature [° C.] observed by heating from 70° C. at a temperature increase rate of 0.5° C./min | | 177 | 177 | 177 | 172 | 185 | 170 | 175 |
| | | Viscosity [mPa · s] observed after heating at 120° C. for 240 minutes | | 140 | 160 | 180 | 190 | 100 | 200 | 170 |
| Cured resin | Property of cured resin | Glass transition temperature [° C.] | | 175 | 182 | 189 | 184 | 178 | 186 | 184 |
| Binder | | Type | | 1 | 1 | 1 | 1 | 1 | 1 | 1 |
| | | Form | | non-woven fabric | non-woven fabric | non-woven fabric | non-woven fabric | non-woven fabric | non-woven fabric | non-woven fabric |
| | | Raw material (melting temperature) | | PA-1 (170° C.) | PA-1 (170° C.) | PA-1 (170° C.) | PA-1 (170° C.) | PA- (170° C.) | PA-1 (170° C.) | PA-1 (170° C.) |

TABLE 1-1-continued

| | | | Ex. 1 | Ex. 2 | Ex. 3 | Ex. 4 | Ex. 5 | Ex. 6 | Ex. 7 |
|---|---|---|---|---|---|---|---|---|---|
| Fiber-reinforced composite material | Properties of fiber-reinforced composite material | 0° compressive strength [MPa] under wet and heat conditions | 1060 | 1130 | 1200 | 1020 | 1130 | 1030 | 1150 |
| | | Compression-after-impact strength [MPa] | 280 | 275 | 260 | 264 | 276 | 260 | 270 |
| | | Microcrack | A | A | B | A | B | A | A |

TABLE 1-2

| | | | | Ex. 8 | Ex. 9 | Ex. 10 | Ex. 11 |
|---|---|---|---|---|---|---|---|
| Epoxy Resin Compo-sition | Epoxy resin | [A] Tetraglycidyl diamino diphenylmethane | "Araldite ®" MY721 | 80 | 80 | 80 | 80 |
| | | [B] Bisphenol F-type epoxy resin | "EPICLON ®" 830 | 20 | 0 | 20 | 20 |
| | | | "Araldite ®" GY282 | 0 | 20 | 0 | 0 |
| | | Epoxy resin other than [A] and [B] | "EPICLON ®" 850 | 0 | 0 [0] | 0 | 0 |
| | Curing agent | [C] 4,4'-Methylenebis(3-chloro-2,6-diethylaniline) | "Lonzacure ®" M-CDEA | 78 | 61 | 61 | 55 |
| | | [D] 4,4'-Methylenebis(3,3',5,5'-tetraisopropylaniline) | "Lonzacure ®" M-DIPA | 5 | 13 | 13 | 23 |
| | | [E] 4,4'-methylenebis(2-isopropyl-6-methylaniline) | "Lonzacure ®" M-MIPA | 4 | 11 | 0 | 0 |
| | | Curing agent other than [C], [D], and [E] | "Lonzacure ®" M-DEA | 0 | 0 | 11 | 0 |
| | | | "KAYAHARD ®" A-A(PT) | 0 | 0 | 0 | 0 |
| | Additive | [F] Core-shell rubber particles having a volume average particle diameter of not less than 50 nm and not more than 300 nm and having epoxy groups in the shell | "Kane Ace ®" MX-416 volume average particle diameter: 100 nm [content of core-shell rubber particles] | 0 [0] | 0 [0] | 0 [0] | 0 [0] |
| | | Core-shell rubber particles other than [F] | "Stafyroid ®" AC-3355 volume average particle diameter: 500 nm | 0 | 0 | 0 | 0 |
| | Content of [C] (% by mass) in the total of curing agents taken as 100% by mass | | | 90 | 72 | 72 | 71 |
| | H/E | | | 1.1 | 1.1 | 1.1 | 1 |
| | Properties of uncured resin | Gelation temperature [° C.] observed by heating from 70° C. at a temperature increase rate of 0.5° C./min | | 184 | 175 | 176 | 178 |
| | | Viscosity [mPa · s] observed after heating at 120° C. for 240 minutes | | 110 | 170 | 160 | 150 |
| Cured resin | Property of cured resin | Glass transition temperature [° C.] | | 180 | 184 | 174 | 187 |
| Binder | Type Form | | | 1 non-woven fabric | 1 non-woven fabric | 1 non-woven fabric | 1 non-woven fabric |
| | Raw material (melting temperature) | | | PA-1 (170° C.) | PA-1 (170° C.) | PA-1 (170° C.) | PA-1 (170° C.) |
| Fiber-reinforced composite material | Properties of fiber-reinforced composite material | 0° compressive strength [MPa] under wet and heat conditions | | 1130 | 1150 | 1040 | 1060 |
| | | Compression-after-impact strength [MPa] | | 275 | 270 | 270 | 267 |
| | | Microcrack | | A | A | A | A |

| | | | | Ex. 12 | Ex.13 | Ex. 14 |
|---|---|---|---|---|---|---|
| Epoxy Resin Compo-sition | Epoxy resin | [A] Tetraglycidyl diamino diphenylmethane | "Araldite ®" MY721 | 80 | 80 | 80 |
| | | [B] Bisphenol F-type epoxy resin | "EPICLON ®" 830 | 20 | 20 | 20 |
| | | | "Araldite ®" GY282 | 0 | 0 | 0 |
| | | Epoxy resin other than [A] and [B] | "EPICLON ®" 850 | 0 | 0 | 0 |
| | Curing agent | [C] 4,4'-Methylenebis(3-chloro-2,6-diethylaniline) | "Lonzacure ®" M-CDEA | 66 | 78 | 55 |

TABLE 1-2-continued

| | | | | | | |
|---|---|---|---|---|---|---|
| | | [D] 4,4'-Methylenebis(3,3',5,5'-tetraisopropylaniline) | "Lonzacure ®" M-DIPA | 28 | 33 | 12 |
| | | [E] 4,4'-methylenebis(2-isopropyl-6-methylaniline) | "Lonzacure ®" M-MIPA | 0 | 0 | 10 |
| | | Curing agent other than [C], [D], and [E] | "Lonzacure ®" M-DEA | 0 | 0 | 0 |
| | | | "KAYAHARD ®" A-A(PT) | 0 | 0 | 0 |
| | Additive | [F] Core-shell rubber particles having a volume average particle diameter of not less than 50 nm and not more than 300 nm and having epoxy groups in the shell | "Kane Ace ®" MX-416 volume average particle diameter: 100 nm [content of core-shell rubber particles] | 0 [0] | 0 [0] | 0 [0] |
| | | Core-shell rubber particles other than [F] | "Stafyroid ®" AC-3355 volume average particle diameter: 500 nm | 0 | 0 | 0 |
| | Content of [C] (% by mass) in the total of curing agents taken as 100% by mass | | | 70 | 70 | 71 |
| | H/E | | | 1.2 | 1.4 | 1 |
| | Properties of uncured resin | Gelation temperature [° C.] observed by heating from 70° C. at a temperature increase rate of 0.5° C./min | | 176 | 173 | 177 |
| | | Viscosity [mPa · s] observed after heating at 120° C. for 240 minutes | | 170 | 190 | 160 |
| Cured resin | Property of cured resin | Glass transition temperature [° C.] | | 177 | 170 | 189 |
| Binder | Type Form | | | 1 non-woven fabric | 1 non-woven fabric | 1 non-woven fabric |
| | Raw material (melting temperature) | | | PA-1 (170° C.) | PA-1 (170° C.) | PA-1 (170° C.) |
| Fiber-reinforced composite material | Properties of fiber-reinforced composite material | 0° compressive strength [MPa] under wet and heat conditions | | 1120 | 1000 | 1080 |
| | | Compression-after-impact strength [MPa] | | 275 | 265 | 266 |
| | | Microcrack | | A | B | A |

TABLE 1-3

| | | | | Ex. 15 | Ex. 16 | Ex. 17 |
|---|---|---|---|---|---|---|
| Epoxy Resin Composition | Epoxy resin | [A] Tetraglycidyl diamino diphenylmethane | "Araldite ®" MY721 | 80 | 80 | 65 |
| | | [B] Bisphenol F-type epoxy resin | "EPICLON ®" 830 | 20 | 20 | 20 |
| | | | "Araldite ®" GY282 | 0 | 0 | 0 |
| | | Epoxy resin other than [A] and [B] | "EPICLON ®" 850 | 0 | 0 | 0 |
| | Curing agent | [C] 4,4'-Methylenebis(3-chloro-2,6-diethylaniline) | "Lonzacure ®" M-CDEA | 66 | 77 | 61 |
| | | [D] 4,4'-Methylenebis(3,3',5,5'-tetraisopropylaniline) | "Lonzacure ®" M-DIPA | 14 | 16 | 26 |
| | | [E] 4,4'-methylenebis(2-isopropyl-6-methylaniline) | "Lonzacure ®" M-MIPA | 12 | 14 | 0 |
| | | Curing agent other than [C], [D], and [E] | "Lonzacure ®" M-DEA | 0 | 0 | 0 |
| | | | "KAYAHARD ®" A-A(PT) | 0 | 0 | 0 |
| | Additive | [F] Core-shell rubber particles having a volume average particle diameter of not less than 50 nm and not more than 300 nm and having epoxy groups in the shell | "Kane Ace ®" MX-416 volume average particle diameter: 100 nm [content of core-shell rubber particles] | 0 [0] | 0 [0] | 20 [5] |
| | | Core-shell rubber particles other than [F] | "Stafyroid ®" AC-3355 volume average particle diameter: 500 nm | 0 | 0 | 0 |

TABLE 1-3-continued

| | | | | | | |
|---|---|---|---|---|---|---|
| | Content of [C] (% by mass) in the total of curing agents taken as 100% by mass | | | 72 | 72 | 70 |
| | H/E | | | 1.2 | 1.4 | 1.1 |
| | Properties of uncured resin | Gelation temperature [° C.] observed by heating from 70° C. at a temperature increase rate of 0.5° C./min | | 175 | 171 | 177 |
| | | Viscosity [mPa · s] observed after heating at 120° C. for 240 minutes | | 180 | 200 | 170 |
| Cured resin | Property of cured resin | Glass transition temperature [° C.] | | 179 | 172 | 182 |
| Binder | Type Form | | | 1 non-woven fabric | 1 non-woven fabric | 1 non-woven fabric |
| | Raw material (melting temperature) | | | PA-1 (170° C.) | PA-1 (170° C.) | PA-1 (170° C.) |
| Fiber-reinforced composite material | Properties of fiber-reinforced composite material | 0° compressive strength [MPa] under wet and heat conditions | | 1140 | 1020 | 1100 |
| | | Compression-after-impact strength [MPa] | | 275 | 264 | 280 |
| | | Microcrack | | A | B | A |

| | | | | Ex. 18 | Ex. 19 | Ex. 20 |
|---|---|---|---|---|---|---|
| Epoxy Resin Compo-sition | Epoxy resin | [A] Tetraglycidyl diamino diphenylmethane | "Araldite ®" MY721 | 50 | 80 | 65 |
| | | [B] Bisphenol F-type epoxy resin | "EPICLON ®" 830 | 20 | 20 | 20 |
| | | | "Araldite ®" GY282 | 0 | 0 | 0 |
| | | Epoxy resin other than [A] and [B] | "EPICLON ®" 850 | 0 | 0 | 0 |
| | Curing agent | [C] 4,4'-Methylenebis(3-chloro-2,6-diethylaniline) | "Lonzacure ®" M-CDEA | 61 | 61 | 78 |
| | | [D] 4,4'-Methylenebis(3,3',5,5'-tetraisopropylaniline) | "Lonzacure ®" M-DIPA | 26 | 26 | 5 |
| | | [E] 4,4'-methylenebis(2-isopropyl-6-methylaniline) | "Lonzacure ®" M-MIPA | 0 | 0 | 4 |
| | | Curing agent other than [C], [D], and [E] | "Lonzacure ®" M-DEA | 0 | 0 | 0 |
| | | | "KAYAHARD ®" A-A(PT) | 0 | 0 | 0 |
| | Additive | [F] Core-shell rubber particles having a volume average particle diameter of not less than 50 nm and not more than 300 nm and having epoxy groups in the shell | "Kane Ace ®" MX-416 volume average particle diameter: 100 nm [content of core-shell rubber particles] | 40 [10] | 0 [0] | 20 [5] |
| | | Core-shell rubber particles other than [F] | "Stafyroid ®" AC-3355 volume average particle diameter: 500 nm | 0 | 5 | 0 |
| | Content of [C] (% by mass) in the total of curing agents taken as 100% by mass | | | 70 | 70 | 90 |
| | H/E | | | 1.1 | 1.1 | 1.1 |
| | Properties of uncured resin | Gelation temperature [° C.] observed by heating from 70° C. at a temperature increase rate of 0.5° C./min | | 177 | 177 | 184 |
| | | Viscosity [mPa · s] observed after heating at 120° C. for 240 minutes | | 190 | 170 | 120 |
| Cured resin | Property of cured resin | Glass transition temperature [° C.] | | 182 | 182 | 180 |
| Binder | Type Form | | | 1 non-woven fabric | 1 non-woven fabric | 1 non-woven fabric |
| | Raw material (melting temperature) | | | PA-1 (170° C.) | PA-1 (170° C.) | PA-1 (170° C.) |
| Fiber-reinforced composite material | Properties of fiber-reinforced composite material | 0° compressive strength [MPa] under wet and heat conditions | | 1000 | 1030 | 1120 |
| | | Compression-after-impact strength [MPa] | | 280 | 265 | 280 |
| | | Microcrack | | A | A | A |

TABLE 1-4

| | | | | Ex. 21 | Ex. 22 | Ex. 23 |
|---|---|---|---|---|---|---|
| Epoxy Resin Compo-sition | Epoxy resin | [A] Tetraglycidyl diamino diphenylmethane | "Araldite ®" MY721 | 65 | 80 | 80 |
| | | [B] Bisphenol F-type epoxy resin | "EPICLON ®" 830 | 20 | 20 | 20 |
| | | | "Araldite ®" GY282 | 0 | 0 | 0 |
| | | Epoxy resin other than [A] and [B] | "EPICLON ®" 850 | 0 | 0 | 0 |
| | Curing agent | [C] 4,4'-Methylenebis(3-chloro-2,6-diethylaniline) | "Lonzacure ®" M-CDEA | 61 | 61 | 61 |
| | | [D] 4,4'-Methylenebis(3,3',5,5'-tetraisopropylaniline) | "Lonzacure ®" M-DIPA | 13 | 13 | 26 |
| | | [E] 4,4'-methylenebis(2-isopropyl-6-methylaniline) | "Lonzacure ®" M-MIPA | 11 | 11 | 0 |
| | | Curing agent other than [C], [D], and [E] | "Lonzacure ®" M-DEA | 0 | 0 | 0 |
| | | | "KAYAHARD ®" A-A(PT) | 0 | 0 | 0 |
| | Additive | [F] Core-shell rubber particles having a volume average particle diameter of not less than 50 nm and not more than 300 nm and having epoxy groups in the shell | "Kane Ace ®" MX-416 volume average particle diameter: 100 nm [content of core-shell rubber particles] | 20 [5] | 0 [0] | 0 [0] |
| | | Core-shell rubber particles other than [F] | "Stafyroid ®" AC-3355 volume average particle diameter: 500 nm | 0 | 5 | 0 |
| | Content of [C] (% by mass) in the total of curing agents taken as 100% by mass | | | 72 | 72 | 70 |
| | H/E | | | 1.1 | 1.1 | 1.1 |
| | Properties of uncured resin | Gelation temperature [° C.] observed by heating from 70° C. at a temperature increase rate of 0.5° C./min | | 175 | 175 | 177 |
| | | Viscosity [mPa · s] observed after heating at 120° C. for 240 minutes | | 180 | 180 | 160 |
| Cured resin | Property of cured resin | Glass transition temperature [° C.] | | 184 | 184 | 184 |
| Binder | Type | | | 1 | 1 | 2 |
| | Form | | | non-woven fabric | non-woven fabric | non-woven fabric |
| | Raw material (melting temperature) | | | PA-1 (170° C.) | PA-1 (170° C.) | PES (N.A.) |
| Fiber-reinforced composite material | Properties of fiber-reinforced composite material | 0° compressive strength [MPa] under wet and heat conditions | | 1140 | 1070 | 1070 |
| | | Compression-after-impact strength [MPa] | | 275 | 260 | 262 |
| | | Microcrack | | A | A | B |

| | | | | Ex. 24 | Ex. 25 | Ex. 26 |
|---|---|---|---|---|---|---|
| Epoxy Resin Compo-sition | Epoxy resin | [A] Tetraglycidyl diamino diphenylmethane | "Araldite ®" MY721 | 80 | 80 | 80 |
| | | [B] Bisphenol F-type epoxy resin | "EPICLON ®" 830 | 20 | 20 | 20 |
| | | | "Araldite ®" GY282 | 0 | 0 | 0 |
| | | Epoxy resin other than [A] and [B] | "EPICLON ®" 850 | 0 | 0 | 0 |
| | Curing agent | [C] 4,4'-Methylenebis(3-chloro-2,6-diethylaniline) | "Lonzacure ®" M-CDEA | 61 | 61 | 61 |
| | | [D] 4,4'-Methylenebis(3,3',5,5'-tetraisopropylaniline) | "Lonzacure ®" M-DIPA | 26 | 26 | 26 |
| | | [E] 4,4'-methylenebis(2-isopropyl-6-methylaniline) | "Lonzacure ®" M-MIPA | 0 | 0 | 0 |
| | | Curing agent other than [C], [D], and [E] | "Lonzacure ®" M-DEA | 0 | 0 | 0 |
| | | | "KAYAHARD ®" A-A(PT) | 0 | 0 | 0 |
| | Additive | [F] Core-shell rubber particles having a volume average particle diameter of not less than 50 nm and not more than 300 nm and having epoxy groups in the shell | "Kane Ace ®" MX-416 volume average particle diameter: 100 nm [content of core-shell rubber particles] | 0 [0] | 0 [0] | 0 [0] |

TABLE 1-4-continued

| | | | | | | |
|---|---|---|---|---|---|---|
| | | Core-shell rubber particles other than [F] | "Stafyroid ®" AC-3355 volume average particle diameter: 500 nm | 0 | 0 | 0 |
| | Content of [C] (% by mass) in the total of curing agents taken as 100% by mass | | | 70 | 70 | 70 |
| | H/E | | | 1.1 | 1.1 | 1.1 |
| | Properties of uncured resin | Gelation temperature [° C.] observed by heating from 70° C. at a temperature increase rate of 0.5° C./min | | 177 | 177 | 177 |
| | | Viscosity [mPa · s] observed after heating at 120° C. for 240 minutes | | 160 | 160 | 160 |
| Cured resin | Property of cured resin | Glass transition temperature [° C.] | | 184 | 184 | 184 |
| Binder | Type Form | | | 3 non-woven fabric | 4 non-woven fabric | 5 particles |
| | Raw material (melting temperature) | | | PA-2 (225° C.) | PA-3 (110° C.) | EP + PES (N.A.) |
| Fiber-reinforced composite material | Properties of fiber-reinforced composite material | 0° compressive strength [MPa] under wet and heat conditions | | 1000 | 1100 | 1090 |
| | | Compression-after-impact strength [MPa] | | 260 | 261 | 268 |
| | | Microcrack | | B | A | A |

TABLE 2-1

| | | | | Comp. Ex. 1 | Comp. Ex. 2 | Comp. Ex. 3 | Comp. Ex. 4 | Comp. Ex. 5 | Comp. Ex. 6 | Comp. Ex. 7 |
|---|---|---|---|---|---|---|---|---|---|---|
| Epoxy Resin Compo-sition | Epoxy resin | [A] Tetraglycidyl diamino diphenylmethane | "Araldite ®" MY721 | 60 | 95 | 80 | 80 | 80 | 80 | 80 |
| | | [B] Bisphenol F-type epoxy resin | "EPICLON ®" 830 | 40 | 5 | 0 | 20 | 20 | 20 | 20 |
| | | Epoxy resin other than [A] and [B] | "EPICLON ®" 850 | 0 | 0 | 20 | 0 | 0 | 0 | 0 |
| | Curing agent | [C] 4,4'-Methylenebis (3-chloro-2,6-diethylaniline) | "Lonzacure ®" M-CDEA | 56 | 64 | 60 | 87 | 0 | 0 | 0 |
| | | [D] 4,4'-Methylenebis (3,3',5,5'-tetraisopropylaniline) | "Lonzacure ®" M-DIPA | 24 | 27 | 25 | 0 | 85 | 0 | 0 |
| | | [E] 4,4'-methylenebis (2-isopropyl-6-methylaniline) | "Lonzacure ®" M-MIPA | 0 | 0 | 0 | 0 | 0 | 71 | 0 |
| | | Curing agent other than [C], [D], and [E] | "Lonzacure ®" M-DEA | 0 | 0 | 0 | 0 | 0 | 0 | 71 |
| | | | "KAYAHARD ®" A-A(PT) | 0 | 0 | 0 | 0 | 0 | 0 | 0 |
| | Additive | [F] Core-shell rubber particles having a volume average particle diameter of not less than 50 nm and not more than 300 nm and having epoxy groups in the shell | "Kane Ace ®" MX-416 volume average particle diameter: 100 nm [content of core-shell rubber particles] | 0 [0] | 0 [0] | 0 [0] | 0 [0] | 0 [0] | 0 [0] | 0 [0] |
| | | Core-shell rubber particles other than [F] | "Stafyroid ®" AC-3355 volume average particle diameter: 500 nm | 0 | 0 | 0 | 0 | 0 | 0 | 0 |
| | Content of [C] (% by mass) in the total of curing agents taken as 100% by mass | | | 70 | 70 | 71 | 100 | 0 | 0 | 0 |
| | H/E | | | 1.1 | 1.1 | 1.1 | 1.1 | 1.1 | 1.1 | 1.1 |
| | Properties of uncured resin | Gelation temperature [° C.] observed by heating from 70° C. at a temperature increase rate of 0.5° C./min | | 177 | 177 | 177 | 195 | 130 | 110 | 120 |

TABLE 2-1-continued

| | | | Comp. Ex. 1 | Comp. Ex. 2 | Comp. Ex. 3 | Comp. Ex. 4 | Comp. Ex. 5 | Comp. Ex. 6 | Comp. Ex. 7 |
|---|---|---|---|---|---|---|---|---|---|
| | | Viscosity [mPa · s] observed after heating at 120° C. for 240 minutes | 100 | 210 | 180 | 90 | >1000 | >1000 | >1000 |
| Cured resin | Property of cured resin | Glass transition temperature [° C.] | 168 | 196 | 187 | 178 | 195 | 200 | 180 |
| Binder | | Type | 1 | 1 | 1 | 1 | 1 | 1 | 1 |
| | | Form | non-woven fabric | non-woven fabric | non-woven fabric | non-woven fabric | non-woven fabric | non-woven fabric | non-woven fabric |
| | | Raw material (melting temperature) | PA-1 (170° C.) | PA-1 (170° C.) | PA-1 (170° C.) | PA-1 (170° C.) | PA-1 (170° C.) | PA-1 (170° C.) | PA-1 (170° C.) |
| Fiber-reinforced composite material | Properties of fiber-reinforced composite material | 0° compressive strength [MPa] under wet and heat conditions | 990 | 1270 | 980 | 1100 | 950 | 930 | 940 |
| | | Compression-after-impact strength [MPa] | 285 | 245 | 275 | 255 | 220 | 200 | 210 |
| | | Microcrack | A | A | A | A | C | C | C |

TABLE 2-2

| | | | | Comp. Ex. 8 | Comp. Ex. 9 | Comp. Ex. 10 |
|---|---|---|---|---|---|---|
| Epoxy Resin Composition | Epoxy resin | [A] Tetraglycidyl diamino diphenylmethane | "Araldite ®" MY721 | 80 | 80 | 80 |
| | | [B] Bisphenol F-type epoxy resin | "EPICLON ®" 830 | 20 | 20 | 20 |
| | | Epoxy resin other than [A] and [B] | "EPICLON ®" 850 | 0 | 0 | 0 |
| | Curing agent | [C] 4,4'-Methylenebis(3-chloro-2,6-diethylaniline) | "Lonzacure ®" M-CDEA | 0 | 61 | 61 |
| | | [D] 4,4'-Methylenebis(3,3',5,5'-tetraisopropylaniline) | "Lonzacure ®" M-DIPA | 0 | 0 | 0 |
| | | [E] 4,4'-methylenebis(2-isopropyl-6-methylaniline) | "Lonzacure ®" M-MIPA | 0 | 21 | 0 |
| | | Curing agent other than [C], [D], and [E] | "Lonzacure ®" M-DEA | 0 | 0 | 21 |
| | | | "KAYAHARD ®" A-A(PT) | 58 | 0 | 0 |
| | Additive | [F] Core-shell rubber particles having a volume average particle diameter of not less than 50 nm and not more than 300 nm and having epoxy groups in the shell | "Kane Ace ®" MX-416 volume average particle diameter: 100 nm [content of core-shell rubber particles] | 0 [0] | 0 [0] | 0 [0] |
| | | Core-shell rubber particles other than [F] | "Stafyroid ®" AC-3355 volume average particle diameter: 500 nm | 0 | 0 | 0 |
| | Content of [C] (% by mass) in the total of curing agents taken as 100% by mass | | | 0 | 74 | 74 |
| | H/E | | | 1.1 | 1.1 | 1.1 |
| | Properties of uncured resin | Gelation temperature [° C.] observed by heating from 70° C. at a temperature increase rate of 0.5° C./min | | 100 | 163 | 168 |
| | | Viscosity [mPa · s] observed after heating at 120° C. for 240 minutes | | >1000 | 280 | 250 |
| Cured resin | Property of cured resin | Glass transition temperature [° C.] | | 170 | 185 | 177 |
| Binder | Type | | | 1 | 1 | 1 |
| | Form | | | non-woven fabric | non-woven fabric | non-woven fabric |
| | Raw material (melting temperature) | | | PA-1 (170° C.) | PA-1 (170° C.) | PA-1 (170° C.) |

TABLE 2-2-continued

| | | | | | | |
|---|---|---|---|---|---|---|
| Fiber-reinforced composite material | Properties of fiber-reinforced composite material | 0° compressive strength [MPa] under wet and heat conditions | | 920 | 970 | 950 |
| | | Compression-after-impact strength [MPa] | | 180 | 240 | 243 |
| | | Microcrack | | C | C | C |

| | | | | Comp. Ex. 11 | Comp. Ex. 12 | Comp. Ex. 13 |
|---|---|---|---|---|---|---|
| Epoxy Resin Composition | Epoxy resin | [A] Tetraglycidyl diamino diphenylmethane | "Araldite ®" MY721 | 80 | 80 | 80 |
| | | [B] Bisphenol F-type epoxy resin | "EPICLON ®" 830 | 20 | 20 | 20 |
| | | Epoxy resin other than [A] and [B] | "EPICLON ®" 850 | 0 | 0 | 0 |
| | Curing agent | [C] 4,4'-Methylenebis(3-chloro-2,6-diethylaniline) | "Lonzacure ®" M-CDEA | 61 | 61 | 61 |
| | | [D] 4,4'-Methylenebis(3,3',5,5'-tetraisopropylaniline) | "Lonzacure ®" M-DIPA | 0 | 0 | 0 |
| | | [E] 4,4'-methylenebis(2-isopropyl-6-methylaniline) | "Lonzacure ®" M-MIPA | 0 | 11 | 11 |
| | | Curing agent other than [C], [D], and [E] | "Lonzacure ®" M-DEA | 0 | 11 | 0 |
| | | | "KAYAHARD ®" A-A(PT) | 18 | 0 | 9 |
| | Additive | [F] Core-shell rubber particles having a volume average particle diameter of not less than 50 nm and not more than 300 nm and having epoxy groups in the shell | "Kane Ace ®" MX-416 volume average particle diameter: 100 nm [content of core-shell rubber particles] | 0 [0] | 0 [0] | 0 [0] |
| | | Core-shell rubber particles other than [F] | "Stafyroid ®" AC-3355 volume average particle diameter: 500 nm | 0 | 0 | 0 |
| | Content of [C] (% by mass) in the total of curing agents taken as 100% by mass | | | 77 | 73 | 75 |
| | H/E | | | 1.1 | 1.1 | 1.1 |
| | Properties of uncured resin | Gelation temperature [° C.] observed by heating from 70° C. at a temperature increase rate of 0.5° C./min | | 150 | 165 | 157 |
| | | Viscosity [mPa · s] observed after heating at 120° C. for 240 minutes | | 400 | 265 | 350 |
| Cured resin | Property of cured resin | Glass transition temperature [° C.] | | 175 | 181 | 180 |
| Binder | Type Form | | | 1 non-woven fabric | 1 non-woven fabric | 1 non-woven fabric |
| | Raw material (melting temperature) | | | PA-1 (170° C.) | PA-1 (170° C.) | PA-1 (170° C.) |
| Fiber-reinforced composite material | Properties of fiber-reinforced composite material | 0° compressive strength [MPa] under wet and heat conditions | | 930 | 960 | 940 |
| | | Compression-after-impact strength [MPa] | | 230 | 242 | 235 |
| | | Microcrack | | C | C | C |

INDUSTRIAL APPLICABILITY

An epoxy resin composition of the present invention for fiber-reinforced composite material maintains a low resin viscosity for a long time while the resin is injected into a reinforcing fiber substrate, and is therefore highly processable and also capable of imparting to a fiber-reinforced composite material high-level physical properties (heat resistance, high compressive strength, impact resistance, and durability) required for use as a large structural material such as aircraft main wing even in cases where the temperature increase rate during thermal curing is low. This will promote the use of fiber-reinforced composite materials, particularly in aircraft applications, which are expected to help improve fuel economy and reduce greenhouse gas emissions through further weight reduction.

The invention claimed is:

1. An epoxy resin composition for fiber-reinforced composite material, comprising [A] tetraglycidyl diaminodiphenylmethane in an amount of not less than 70% by mass and not more than 90% by mass of total epoxy resin components taken as 100% by mass, [B] a bisphenol F-type epoxy resin having a resin viscosity at 50° C. in a range of 1,000 to 8,000 mPa·s in an amount of not less than 10% by mass and not more than 30% by mass by mass of total epoxy resin components taken as 100% by mass, [C] 4,4'-methylenebis (3-chloro-2,6-diethylaniline), and [D] 4,4'-methylenebis(3,3',5,5'-tetraisopropylaniline).

2. The epoxy resin composition of claim 1 for fiber-reinforced composite material, further comprising [E] 4,4'-methylenebis(2-isopropyl-6-methylaniline).

3. The epoxy resin composition of claim 1 for fiber-reinforced composite material, further comprising [F] core-shell rubber particles having a volume average particle diameter of not less than 50 nm and not more than 300 nm and having epoxy groups in the shell.

4. The epoxy resin composition of claim 1 for fiber-reinforced composite material, wherein the resin viscosity n (mPa·s) of the epoxy resin composition is within the following range: 20≤n≤200 when measured with an E-type viscometer after heating under isothermal conditions at 120° C. for 240 minutes.

5. The epoxy resin composition of claim 1 for fiber-reinforced composite material, wherein gelation occurs in the temperature range of 170° C. to 185° C. when the epoxy resin composition is heated from 70° C. at a temperature increase rate of 0.5° C./min.

6. A fiber-reinforced composite material, comprising a cured product of the epoxy resin composition of claim 1 for fiber-reinforced composite material and a reinforcing fiber substrate.

7. The fiber-reinforced composite material of claim 6, wherein the reinforcing fiber substrate is a preform formed by stacking a plurality of sheets of reinforcing fiber substrate bonded by a nonwoven form of binder.

8. The fiber-reinforced composite material of claim 7, wherein the nonwoven form of the binder is composed of a polyamide having a melting temperature of 165° C. or higher and 180° C. or lower.

9. The fiber-reinforced composite material of claim 7, wherein the amount of the nonwoven form of the binder applied to the surface of the sheets of reinforcing fiber substrate is not less than 0.5 $g/m^2$ and not more than 10 $g/m^2$ on each side.

10. The fiber-reinforced composite material of claim 6, wherein a reinforcing fiber as a component of the reinforcing fiber substrate is a carbon fiber.

11. A method of producing a fiber-reinforced composite material, the method comprising injecting the epoxy resin composition of claim 1 for fiber-reinforced composite material heated to a temperature of 50° C. or higher and 130° C. or lower into a reinforcing fiber substrate placed in a mold heated to a temperature of 90° C. or higher and 180° C. or lower; impregnating the reinforcing fiber substrate with the epoxy resin composition; and curing the epoxy resin composition in the mold.

* * * * *